US012681196B2

(12) United States Patent
Joannopoulos et al.

(10) Patent No.: US 12,681,196 B2
(45) Date of Patent: Jul. 14, 2026

(54) METHODS AND APPARATUSES FOR ENHANCING SCINTILLATION WITH OPTICAL NANOSTRUCTURES FOR SCINTILLATORS, LEDS, AND LASER SOURCES

(71) Applicants:Massachusetts Institute of Technology, Cambridge, MA (US); Technion Research & Development Foundation Limited, Haifa (IL)

(72) Inventors: John Joannopoulos, Belmont, MA (US); Steven Johnson, Arlington, MA (US); Marin Soljacic, Belmont, MA (US); Steven Kooi, Lexington, MA (US); Justin Beroz, Cambridge, MA (US); Ido Kaminer, Haifa (IL); Nicholas Rivera, Somerville, MA (US); Yi Yang, Cambridge, MA (US); Charles Roques-Carmes, Cambridge, MA (US); Ali Ghorashi, Boston, MA (US); Zin Lin, Boston, MA (US); Nicolas Romeo, Somerville, MA (US)

(73) Assignees: Massachusetts Institute of Technology, Cambridge, MA (US); TECHNION RESEARCH & DEVELOPMENTAL FOUNDATION LIMITED, Haifa (IL)

( * ) Notice: Subject to any disclaimer, the term of this patent is extended or adjusted under 35 U.S.C. 154(b) by 333 days.

(21) Appl. No.: 18/286,808

(22) PCT Filed: Apr. 12, 2022

(86) PCT No.: PCT/US2022/024405
§ 371 (c)(1),
(2) Date: Oct. 13, 2023

(87) PCT Pub. No.: WO2022/225747
PCT Pub. Date: Oct. 27, 2022

(65) Prior Publication Data
US 2024/0210576 A1      Jun. 27, 2024

Related U.S. Application Data

(60) Provisional application No. 63/178,176, filed on Apr. 22, 2021.

(51) Int. Cl.
*G01T 1/20* (2006.01)
*G01N 23/04* (2018.01)
(Continued)

(52) U.S. Cl.
CPC .......... *G01T 1/2018* (2013.01); *G01N 23/04* (2013.01); *G01N 23/083* (2013.01); *G01N 23/2251* (2013.01)

(58) Field of Classification Search
CPC .... G01T 1/2018; G01N 23/04; G01N 23/083; G01N 23/2251
See application file for complete search history.

(56) References Cited

U.S. PATENT DOCUMENTS 7,126,147 B2    10/2006  Trauernicht et al.
2025/0137942 A1*  5/2025  Soljacic ................. G01N 23/04

OTHER PUBLICATIONS

An et al., Photonic crystal structure in Nd:YAG laser crystals. Optical Materials. Apr. 2012;34:1811-4.
(Continued)

*Primary Examiner* — Nicole M Ippolito
(74) *Attorney, Agent, or Firm* — Nields, Lemack & Frame, LLC

(57) ABSTRACT

Methods and systems are disclosed that enhance the yield and speed of emission and control the spectral and angular emission of light emitted by materials under irradiation by high-energy particles through a process known as scintillation. In each case, a photonic structure (of nano- or micron- (Continued)

scale feature sizes) is integrated with a scintillating material, and the photonic structure enhances the yield or controls the spectrum of the material. Various embodiments of this technology and practical demonstrations are disclosed.

20 Claims, 12 Drawing Sheets

(51) Int. Cl.

| | |
|---|---|
| *G01N 23/08* | (2006.01) |
| *G01N 23/083* | (2018.01) |
| *G01N 23/22* | (2018.01) |
| *G01N 23/2251* | (2018.01) |

(56) References Cited

OTHER PUBLICATIONS

Atre et al., Nanoscale optical tomography with cathodoluminescence spectroscopy. Nat Nanotechnol. May 2015;10(5):429-36.

Bogdankevich, Electron-beam-pumped semiconductor lasers. Quantum Electronics. Dec. 1994;24(12):1031-53.

Brenny et al., Quantifying coherent and incoherent cathodoluminescence in semiconductors and metals. J Appl Phys. Apr. 2014;115:8 pages.

Chan et al., Emulating one-dimensional resonant Q-matching behavior in a two-dimensional system via Fano resonances. Phys Review A. May 2006;74:4 pages.

Chan et al., Direct calculation of thermal emission for three-dimensionally periodic photonic crystal slabs. Phys Review E. May 2006;74:9 pages.

Chen et al., Simulated performances of pixelated CsI(TI) scintillation screens with different micro-col. shapes and array structures in X-ray imaging. Sci Rep. Nov. 14, 2018;8(1):16819.

Coenen et al., Directional emission from plasmonic Yagi-Uda antennas probed by angle-resolved cathodoluminescence spectroscopy. Nano Lett. Sep. 14, 2011;11(9):3779-84.

Coenen et al., Cathodoluminescence for the 21st century: Learning more from light. Appl Phys Rev. May 2017;4:15 pages.

Crytur, Ionizing Radiation Detection, 16 pages, 2023.

Crytur, High Resolution Imaging, 12 pages, 2023.

Drouin et al., Casino: A New Monte Carlo Code in C Language for Electron Beam Interactions—Part II : Tabulated Values of the Mott Cross Section. Scanning. vol. 19, pp. 20-28, Dec. 1995.

Dujardin et al., Needs, Trends, and Advances in Inorganic Scintillators. IEEE Transactions on Nuclear Science. vol. 65, No. 8, pp. 1977-1997, Aug. 2018.

Girard et al., Overview of radiation induced point defects in silica-based optical fibers. Reviews in Physics. vol. 4, 18 pages, Nov. 2019.

Greffet et al., Light Emission by Nonequilibrium Bodies: Local Kirchhoff Law. Physical Review X. vol. 8, 12 pages, Dec. 2017.

Griscom, Optical Properties and Structure of Defects in Silica Glass. The Centennial Memorial Issue of The Ceramic Society of Japan, 99(10); 923-42, 1991.

Hayee et al., Revealing multiple classes of stable quantum emitters in hexagonal boron nitride with correlated optical and electron microscopy. Nat Mater. May 2020;19(5):534-539.

Hormozan et al., Towards High-Resolution X-Ray Imaging Using a Structured Scintillator. IEEE Transactions on Nuclear Science, vol. 59, No. 1, pp. 19-23, Feb. 2012.

Hovington et al., CASINO : A New Monte Carlo Code in C Language for Electron Beam Interaction—Part I: Description of the Program. Scanning. vol. 19, 14 pages, Dec. 1995.

Hovington et al., Casino: A New Monte Carlo Code in C Language for Electron Beam Interactions—Part III : Stopping Power at Low Energies. Scanning. vol. 19, pp. 29-35, Dec. 1995.

Klein, Bandgap Dependence and Related Features of Radiation Ionization Energies in Semiconductors. Journal of Applied Physics. vol. 39, No. 4, pp. 2029-2038, Mar. 1968.

Knapitsch et al., Review on photonic crystal coatings for scintillators. International Journal of Modern Physics A. vol. 29, No. 30, 31 pages, Oct. 2014.

Kurman et al., Photonic-Crystal Scintillators: Molding the Flow of Light to Enhance X-Ray and γ-Ray Detection. Phys Rev Lett. Jul. 24, 2020;125(4):040801.

Kuttge et al., Local density of states, spectrum, and far-field interference of surface plasmon polaritons probed by cathodoluminescence. Physical Review B. vol. 79, 4 pages, Oct. 2008.

Li et al., Holographic free-electron light source. Nature Communications. vol. 7, 6 pages, Dec. 2016.

Liu et al., Light-Emitting Metasurfaces: Simultaneous Control of Spontaneous Emission and Far-Field Radiation. Nano Lett. Nov. 14, 2018;18(11):6906-6914.

Liu et al., Performance of pixelated CsI scintillation screen with hexagonal array arrangement prepared by vacuum melting injection method. Nuclear Inst. and Methods in Physics Research, A. vol. 903, pp. 18-24, Sep. 2018.

Meuret et al., Photon bunching in cathodoluminescence. Phys Rev Lett. May 15, 2015;114(19):197401.

Mignuzzi et al., Energy—Momentum Cathodoluminescence Spectroscopy of Dielectric Nanostructures. ACS Photonics. vol. 5, No. 4, pp. 1381-1387, Jan. 2018.

Miller et al., Fundamental limits to optical response in absorptive systems. Opt Express. Feb. 22, 2016;24(4):3329-64.

Oba et al., A CsI(Na) Scintillation Plate with High Spatial Resolution. Advances in Electronics and Electron Physics. vol. 74, pp. 247-255, 1988.

Osorio et al., Angle-Resolved Cathodoluminescence Imaging Polarimetry. ACS Photonics. vol. 3, No. 1, pp. 147-154, Dec. 2015.

Polimeridis et al., Fluctuating volume-current formulation of electromagnetic fluctuations in inhomogeneous media: Incandescence and luminescence in arbitrary geometries. Physical Review B. vol. 92, 16 pages, 2015.

Riva, Development of new thin film scintillators for high-resolution X-ray imaging. Physics, University of Lyon, Feb. 2017.

Rodenas et al., Three-dimensional femtosecond laser nanolithography of crystals. Nature Photonics. vol. 13, pp. 105-109, Dec. 2018.

Saha, Basics of PET Imaging: Physics, Chemistry, and Regulations. Department of Molecular and Functional Imaging The Cleveland Clinic Foundation, 219 pages, 2005.

Schulz et al., Reciprocity approach for calculating the Purcell effect for emission into an open optical system. Opt Express. Jul. 23, 2018;26(15):19247-19258.

Sola-Garcia et al., Electron-Induced State Conversion in Diamond NV Centers Measured with Pump-Probe Cathodoluminescence Spectroscopy. ACS Photonics. Jan. 15, 2020;7(1):232-240.

Sola-Garcia et al., Photon Statistics of Incoherent Cathodoluminescence with Continuous and Pulsed Electron Beams. ACS Photonics. Mar. 17, 2021;8(3):916-925.

Spinelli et al., Plasmonic light trapping in thin-film Si solar cells. Journal of Optics. vol. 14, No. 2, 12 pages, Jul. 2011.

Wurfel, The chemical potential of radiation. J. Phys. C: Solid State Phys., vol. 15, pp. 3967-3985, 1982.

Yang et al., Plasma etching of cesium iodide. Journal of Vacuum Science & Technology A. vol. 20, pp. 132-137, Oct. 2001.

Zhang et al., Calculation of the emission power distribution of microstructured OLEDs using the reciprocity theorem. Synthetic Metals. vol. 205, pp. 127-133, Jan. 2015.

Zheng et al., Giant Enhancement of Cathodoluminescence of Monolayer Transitional Metal Dichalcogenides Semiconductors. Nano Lett. Oct. 11, 2017;17(10):6475-6480.

* cited by examiner

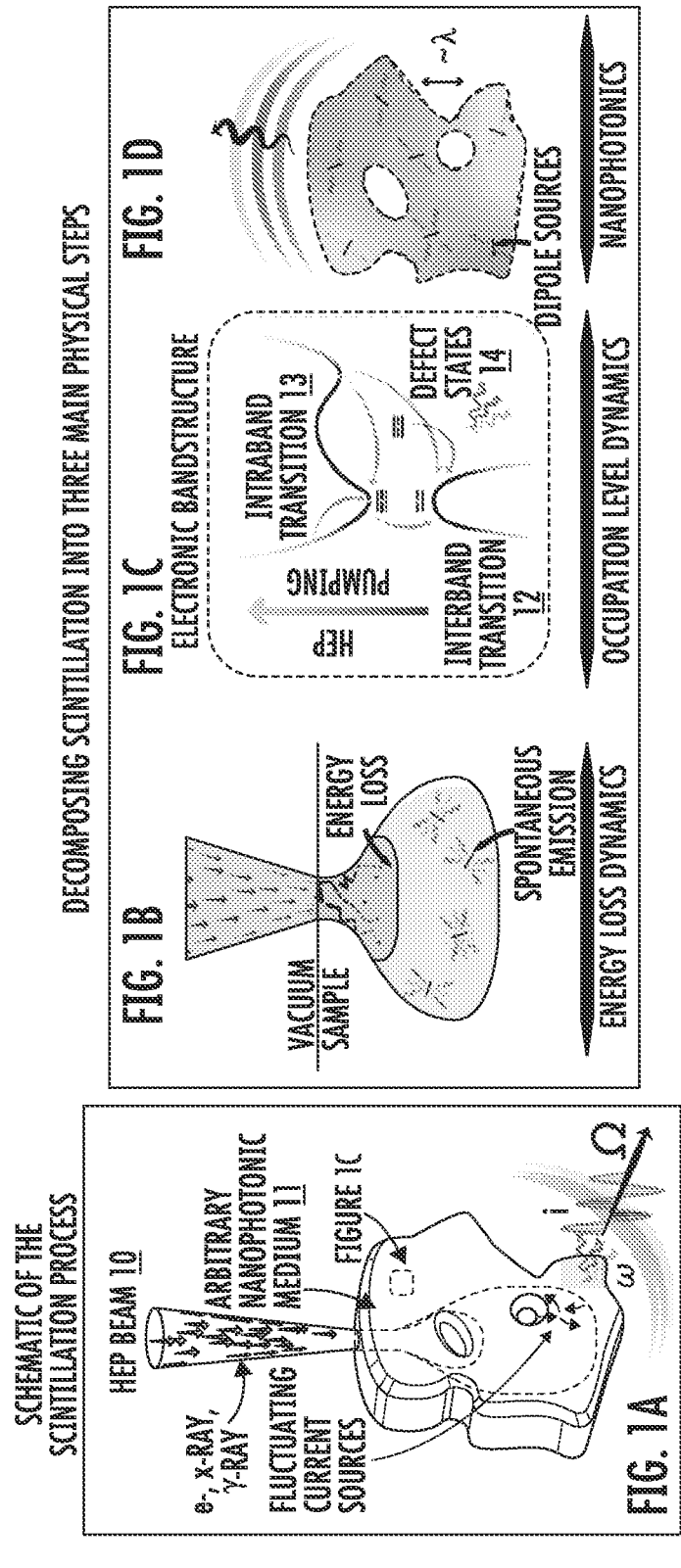

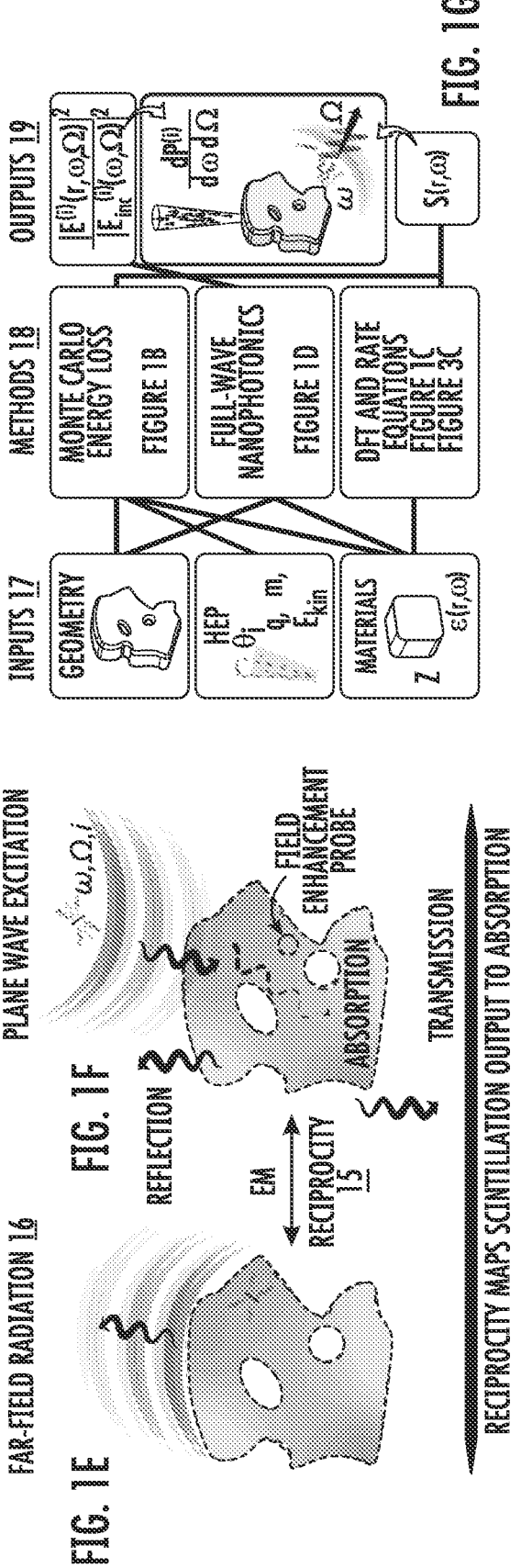

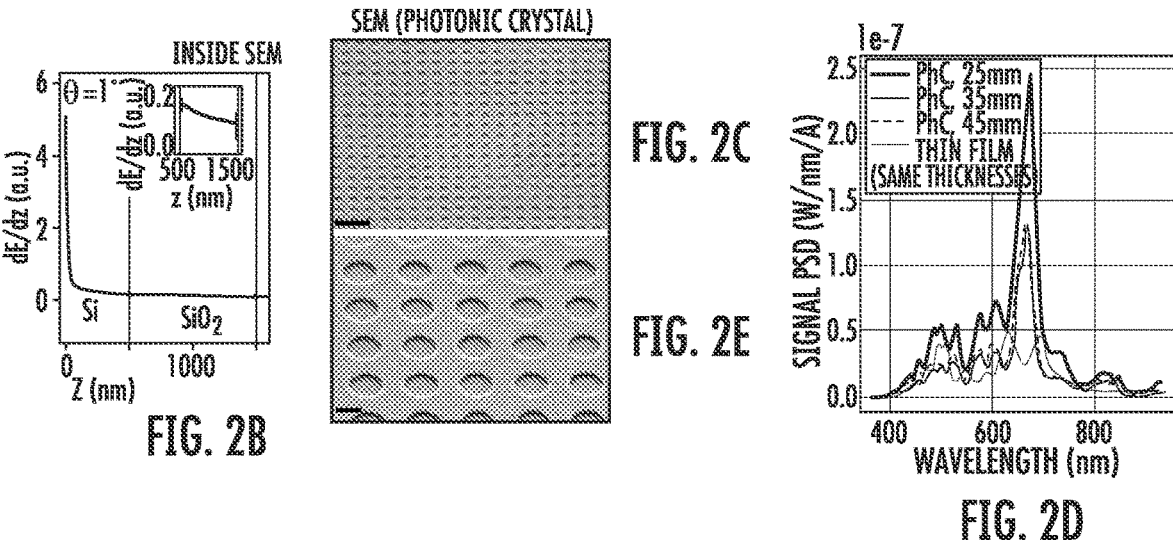
FIG. 2B
INSIDE SEM
FIG. 2C
SEM (PHOTONIC CRYSTAL)
FIG. 2E
FIG. 2D
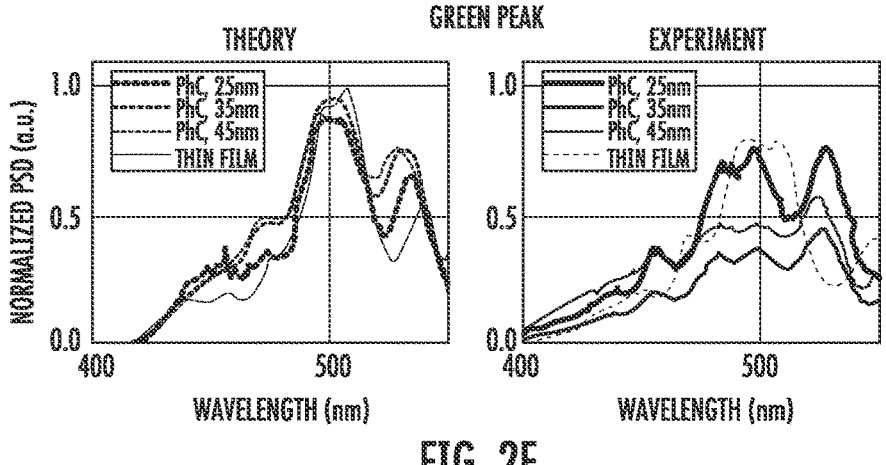
GREEN PEAK
THEORY          EXPERIMENT
FIG. 2F
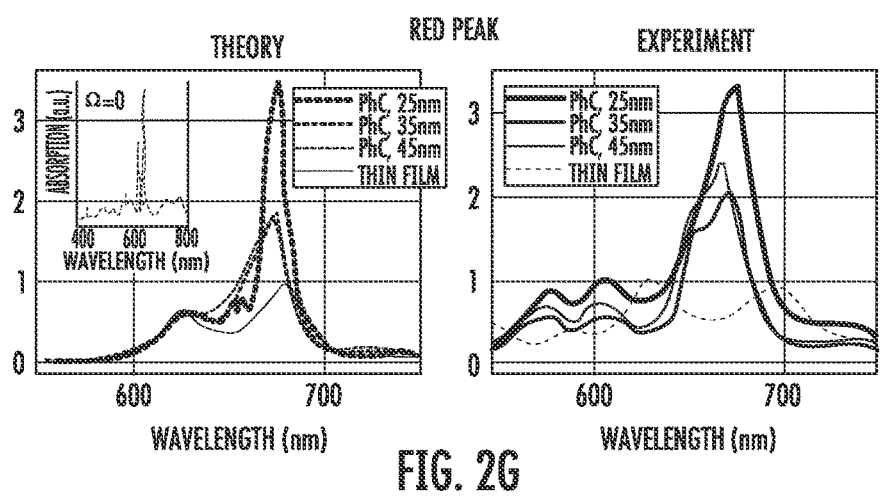
RED PEAK
THEORY          EXPERIMENT
FIG. 2G

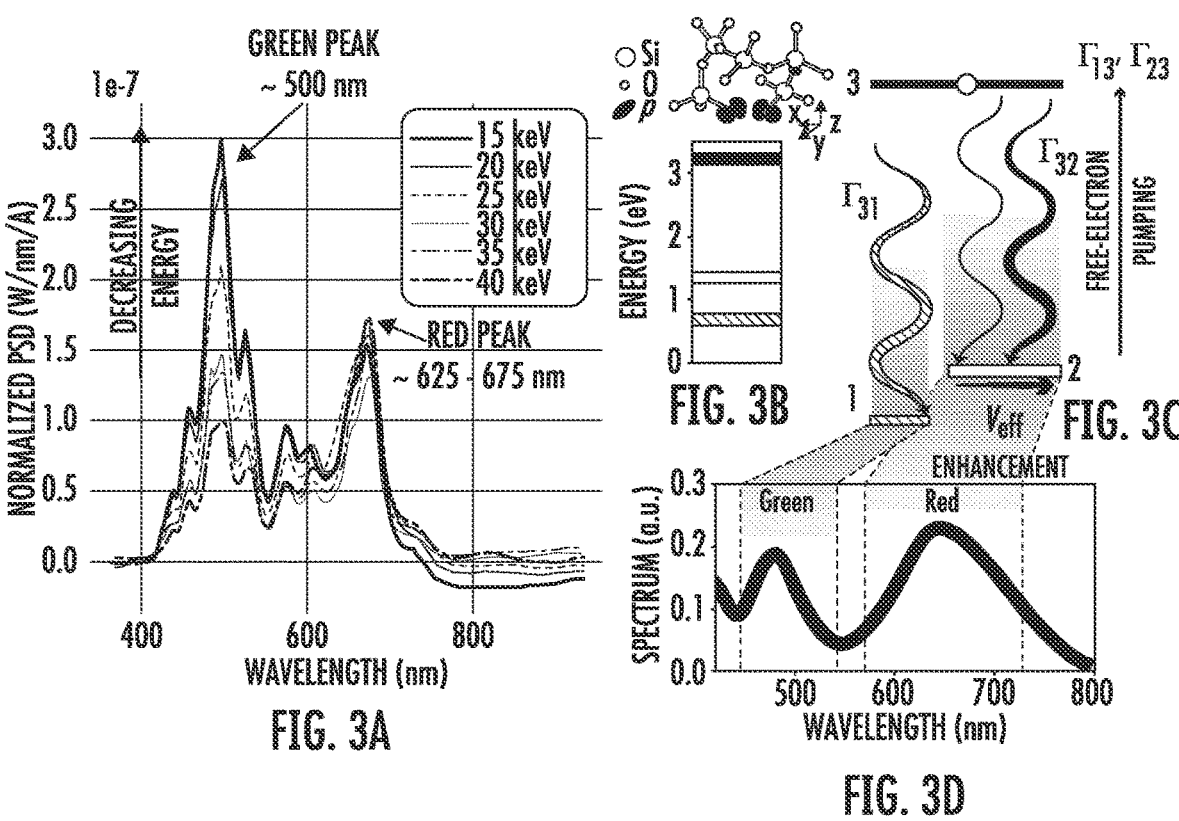
FIG. 3A
FIG. 3B
FIG. 3C
FIG. 3D
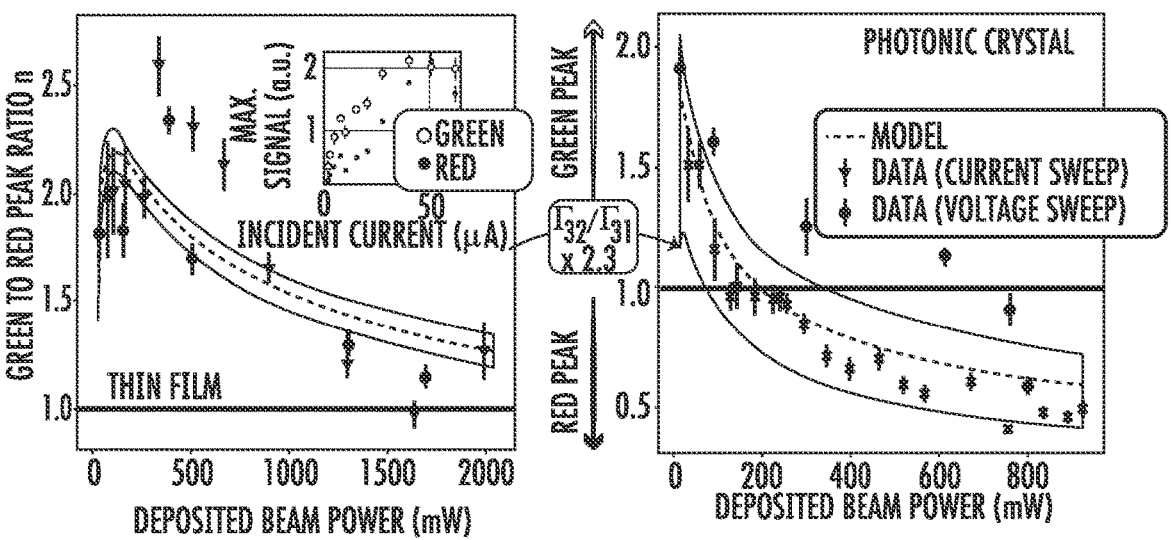
FIG. 3E

INVERSE - DESIGNED SCINTILLATOR MATERIAL FOR HIGH - ENERGY PARTICLE DETECTION -

NANOPHOTONIC STRUCTURE ENHANCING
SCINTILLATION 83

86

PHOTODET.
84

ELECTRONICS
+
IMAGE
PROCESSING
85

HIGH - ENERGY PARTICLE DETECTOR ARRAY 80

PATIENT 82

81

RADIOACTIVE
ELEMENTS RADIATING
HIGH - ENERGY PARTICLES 90

UV PHOTONS 93

CLADDING OF UV SCINTILLATORS 92

WATER 91

RADIOACTIVE MATERIAL 95

UV LIGHT FROM SCINTILLATION

SCINTILLATING MATERIAL 96

COMPACT ELECTRON OR OTHER HEP SOURCE 97

WATER

HEP

SCINTILLATOR MATERIAL 98

METHODS AND APPARATUSES FOR ENHANCING SCINTILLATION WITH OPTICAL NANOSTRUCTURES FOR SCINTILLATORS, LEDS, AND LASER SOURCES

This application claims priority to U.S. Provisional Patent Application Ser. No. 63/178,176, filed Apr. 22, 2021, the disclosure of which is hereby incorporated by reference in its entirety.

This invention was made with government support under FA9550-20-1-0115 awarded by the Air Force Office of Scientific Research, HR0011-2-09-0081 awarded by the Defense Advanced Research Projects Agency, and W911NF-18-2-0048 awarded by the U.S. Army Research Office. The government has certain rights in the invention.

FIELD

Scintillating devices are disclosed, which are patterned so as to improve the scintillation yield.

BACKGROUND

Scintillation, the light produced by materials under bombardment by a beam of high-energy electrons, is a ubiquitous phenomenon applied in a wide range of technologies, from medical tomography to security scanners, particle accelerators, and electron microscopes. Beyond this utility, scintillation is, in many cases, a very efficient light-emission mechanism, converting up to a third of the energy of the incident electron beam into radiation.

A particularly attractive prospect is to shape and/or enhance scintillation by shaping the luminescing material or placing it near optical structures such as photonic crystals, resonators, and plasmonic structures. Such shaping could be used to enhance the efficiency of scintillation at chosen frequencies. This is of interest for light sources and applications where one wants to amplify a weak scintillation signal from an analyte (e.g., a biological specimen). Enhancing the efficiency of scintillation with photonic structures sounds quite plausible, as, on the one hand, it appears directly analogous to enhancing the spontaneous emission of quantum emitters via the Purcell effect. On the other hand, qualitatively, being emission from fluctuating currents in a non-equilibrium quasi-steady-state, bears important similarity to thermal radiation, the latter of which is fundamentally limited by the blackbody spectrum.

Despite the ubiquity of scintillation in many fields of research, there has not yet been work using a theory to predict and model any type of scintillation, particularly in artificially structured nanophotonic composites. Such a theory may directly translate into experimental capability of controlling the yield, speed, and spectral and angular properties of scintillation.

Therefore, it would be beneficial if there were a theory that accurately modeled scintillation. Further, it would be advantageous if there was a method that utilized this theory to create photonic structures with improved scintillation.

SUMMARY

Methods and systems are disclosed that enhance the yield and speed of emission and control the spectral, angular and polarization emission of light emitted by materials under irradiation by high-energy particles through a process known as scintillation. In each case, a photonic structure (of nano- or micron-scale feature sizes) is integrated with a scintillating material, and the photonic structure enhances the yield or controls the spectrum of the material. Additionally, embodiments of this technology and practical demonstrations are disclosed. Several applications based on this enhanced scintillation are also described. This concept is experimentally demonstrated by enhancing scintillation induced by high-energy electrons created in an electron microscope. Additionally, embodiments using enhanced scintillators medical for imaging, radioactivity surveillance, and high-energy physics applications are disclosed. Enhanced UV scintillation for applications in water purification and pathogen decontamination are also disclosed. Additionally, UV lasers for water purification, as well as fundamental science applications, are disclosed.

According to one embodiment, a scintillating device is disclosed. The scintillating device comprises a substrate having a thickness, wherein the substrate is patterned: that a scintillation yield of the scintillating device is at least 10% greater than a device comprising the substrate having the thickness that is not patterned. In certain embodiments, the scintillation yield is at least 20% greater than the device comprising the substrate having the thickness that is not patterned. In certain embodiments, the scintillation yield is at least 50% greater than the device comprising the substrate having the thickness that is not patterned. In certain embodiments, the scintillation yield is at least 75% greater than the device comprising the substrate having the thickness that is not patterned. In certain embodiments, the scintillation yield is at least 100% greater than the device comprising the substrate having the thickness that is not patterned. In certain embodiments, the scintillation yield is at least 200% greater than the device comprising the substrate having the thickness that is not patterned. In certain embodiments, the scintillation yield is at least 1000% greater than the device comprising the substrate having the thickness that is not patterned. In some embodiments, the substrate pattern comprises a single hole, square or other shape with features having dimensions between 10 nm and 10 microns, or a periodic or aperiodic array of holes, squares, or other shapes with features having dimensions between 10 nm and 10 microns, wherein the features comprise radius, side length or other geometric parameters. In certain embodiments, the depth of the holes, squares or other shapes is between 10 nm and 10 microns. In some embodiments, the substrate is patterned in a three-dimensional, periodic or aperiodic fashion. In some embodiments, a metallic thin film is deposited on the surface of the substrate and patterned. In certain embodiments, the thickness of the metallic thin film is between 1 nm and 1000 nm. In some embodiments, the substrate is patterned in a one-dimensional fashion in a periodic or aperiodic fashion, resulting in an arrangement of multiple layers of materials, where each layer has a thickness of 10 nm to 10 microns. In some embodiments, the substrate comprises one or more layers of materials disposed on a metallic substrate. In some embodiments, a top layer is patterned, where a top layer comprises single hole, square, post, cylinder or other extruded structure or a periodic or aperiodic array of holes, squares, posts, cylinders or other extruded structures having a dimension of 10 nm to 10 microns. In some embodiments, one or multiple layers of a two-dimensional material are deposited on the substrate. In certain embodiments, the two-dimensional material comprises hexagonal boron nitride, graphene, or molybdenum disulphide. In certain embodiments, the two-dimensional material comprises a single hole, square, post, cylinder or other extruded structure or a periodic or aperiodic array of holes, squares, posts, cylinders or other extruded structures having a dimension of 10 nm to 10 microns.

According to another embodiment, a scintillating device is disclosed. The scintillation device comprises a substrate having a thickness, wherein the substrate is patterned such that, to achieve a predetermined scintillation yield, the thickness of the scintillating device is decreased by at least 10% as compared to a device comprising the substrate that is not patterned. In certain embodiments, the thickness is decreased by at least 20% as compared the device comprising the substrate that is not patterned. In certain embodiments, the thickness is decreased by at least 50% as compared the device comprising the substrate that is not patterned. In certain embodiments, the thickness is decreased by at least 75% as compared the device comprising the substrate that is not patterned. In certain embodiments, the thickness is decreased by at least 90% as compared the device comprising the substrate that is not patterned. In certain embodiments, the thickness is decreased by at least 95% as compared the device comprising the substrate that is not patterned.

According to another embodiment, a scintillating device is disclosed. The scintillation device comprises a substrate having a thickness, wherein the substrate is patterned such that, the directivity of the scintillation photons is increased by at least 10% as compared to a device comprising the substrate that is not patterned. In certain embodiments, the directivity is increased by at least 20% as compared the device comprising the substrate that is not patterned. In certain embodiments, the directivity is increased by at least 50% as compared the device comprising the substrate that is not patterned. In certain embodiments, the directivity is increased by at least 75% as compared the device comprising the substrate that is not patterned. In certain embodiments, the directivity is increased by at least 100% as compared the device comprising the substrate that is not patterned. In certain embodiments, the directivity is increased by at least 200% as compared the device comprising the substrate that is not patterned. In certain embodiments, the directivity is increased by at least 1000% as compared the device comprising the substrate that is not patterned.

According to another embodiment, a scintillating device is disclosed. The scintillation device comprises a substrate wherein a pattern is disposed on the substrate; the pattern comprises features having dimensions between 10 nm and 10 microns; and wherein the pattern is created by a computer program. In certain embodiments, the computer program calculates HEP energy loss densities, scintillation wavelength of emission and spectral bandwidths, and electromagnetic fields induced in the device. In certain embodiments, the computer calculates a gradient of a given Figure of Merit with respect to continuous degrees of freedom describing a geometry and material properties of the device and optimizes the Figure of Merit based on the gradient.

In certain embodiments, the Figure of Merit comprises maximizing an effective volume of absorption in a scintillating material at one or more given scintillating frequencies and/or angles and/or polarizations of interest. In certain embodiments, the effective volume of absorption is increased by at least 10%. In certain embodiments, the effective volume of absorption is increased by at least 20%. In certain embodiments, the effective volume of absorption is increased by at least 50%. In certain embodiments, the effective volume of absorption is increased by at least 75%. In certain embodiments, the effective volume of absorption is increased by at least 100%. In certain embodiments, the effective volume of absorption is increased by at least 200%. In certain embodiments, the effective volume of absorption is increased by at least 1000%.

In some embodiments, the Figure of Merit comprises maximizing a local density of photonic states in a scintillating material. In certain embodiments, the local density of photonic states is increased by at least 10%. In certain embodiments, the local density of photonic states is increased by at least 20%. In certain embodiments, the local density of photonic states is increased by at least 50%. In certain embodiments, the local density of photonic states is increased by at least 75%. In certain embodiments, the local density of photonic states is increased by at least 100%. In certain embodiments, the local density of photonic states is increased by at least 200%. In certain embodiments, the local density of photonic states is increased by at least 1000%.

In some embodiments, the Figure of Merit comprises minimizing a required dose (amount of incident HEPs) to achieve a given scintillation yield. In certain embodiments, the required dose is decreased by at least 10%. In certain embodiments, the required dose is decreased by at least 20%. In certain embodiments, the required dose is decreased by at least 50%. In certain embodiments, the required dose is decreased by at least 75%. In certain embodiments, the required dose is decreased by at least 90%. In certain embodiments, the required dose is decreased by at least 95%.

In some embodiments, the Figure of Merit comprises minimizing a required substrate thickness to achieve a given scintillation yield. In certain embodiments, the required substrate thickness is decreased by at least 10%. In certain embodiments, the required substrate thickness is decreased by at least 20%. In certain embodiments, the required substrate thickness is decreased by at least 50%. In certain embodiments, the required substrate thickness is decreased by at least 75%. In certain embodiments, the required substrate thickness is decreased by at least 90%. In certain embodiments, the required substrate thickness is decreased by at least 95%.

In some embodiments, the Figure of Merit comprises maximizing an overlap between HEP energy loss and a scintillating material. In certain embodiments, the overlap is increased by at least 10%. In certain embodiments, the overlap is increased by at least 20%. In certain embodiments, the overlap is increased by at least 50%. In certain embodiments, the overlap is increased by at least 75%. In certain embodiments, the overlap is increased by at least 100%. In certain embodiments, the overlap is increased by at least 200%. In certain embodiments, the overlap is increased by at least 1000%.

According to another embodiment, system to display and reconstruct scintillation emission is disclosed. The system comprises a light detection system; and the scintillating device of any of the previous embodiments; wherein the system is used to detect high energy particles from a known source in an HEP imaging system or from the environment.

According to another embodiment, a Positron Emission Tomography or Computerized Tomography system is disclosed. The system comprises a light detection system; and the scintillating device of any of the previous embodiments.

According to another embodiment, an X-Ray imaging system is disclosed. The system comprises a light detection system; and the scintillating device of any of the previous embodiments.

According to another embodiment, a system is disclosed. The system comprises a light detection system; an HEP source; the scintillating device of any of the previous embodiments; and a specimen, wherein the specimen is located between the scintillating device and the HEP source. In certain embodiments, the system is enclosed in a vacuum chamber, to image the specimen using charged HEPs such as free electrons. In certain embodiments, the system comprises a cathodoluminescence detector in an electron microscope.

According to another embodiment, a sanitizing system is disclosed. The system comprises a HEP source; and the scintillating device of any of the previous embodiments, wherein the scintillation emission is mostly in the ultraviolet range (wavelength<400 nm); where the scintillating device is disposed in the vicinity of a surface to sanitize.

According to another embodiment, a water sanitizing system is disclosed. The system comprises a HEP source; and the scintillating device of any of the previous embodiments, wherein the scintillation emission is mostly in the ultraviolet range (wavelength<400 nm); where the scintillating device is disposed in the vicinity of a water container so as to sanitize water in the water container.

According to another embodiment, a light source is disclosed. The light source comprises the scintillating device of any of the previous embodiments.

According to another embodiment, a laser is disclosed. The laser comprises the scintillating device of any of the previous embodiments, wherein the substrate provides optical feedback, and the scintillation emission results in optical gain.

According to another embodiment, one of the materials in the substrate is a scintillating material, and the scintillating material comprises one or several of:

- silicon, silicon dioxide (crystalline and amorphous), rare-earth doped silicon or silica;
- Dielectric thin films, such as: $SiO_2$, $TiO_2$, $Ta_2O_5$, $Al_2O_3$, $HfO_2$, $V_2O_5$, $VO_2$, $AgO$, $MgO$;
- Boron nitride (hexagonal and cubic), graphene;
- Transition metal dichalcogenides;
- Quantum dot and quantum well materials (e.g., Cds, AlGaAs);
- Large-bandgap material such as diamond, boron nitride, AlN;
- Semiconducting materials such as GaAs, GaP, GaN, GaInN and quantum well structures (multilayer of $GaN/In_xGa_{1-x}N$ for instance);
- Metals (and rare earths): Ag, Ta, Ni, Fe, Cr, Cu, Co, FeMn, V, Hf, Gd, Sc, Zn, Sn, Mn, TiN, TaN, Ti, Au, (and Er, Ce, Sc, Y, La, Pr, Nd, Pm, Sm, Eu, Gd, Tb, Dy, Ho, Tm, Yb, Lu);
- Nitride thin films such as AlN, SiN, HEN, GaN (doped or not), InGaN, AlGaN;
- Perovskite materials (for instance $MAPbX3$ and $CsPbX3$ where X=Br, Cl, I) and perovskite quantum dots or nanoscrystals;
- Heavy materials (large Z)-doped dielectric and semiconductor structures (silica, silicon, alumina, titanium dioxide, etc.);
- Materials known for their scintillation properties (doped or undoped): NaI, BGO, LSO, YSO, GSO, BaF2, CaF2, CeBr3, Chromox, CLYC, CsI, CsI(Na), CsI(Tl), GGG, GAGG(Ce), GFAG(Ce), LaBr3(Ce), LBC, LSO (Ce), LuAG(Ce), LuAG(Pr), LuAP(Ce), LYSO(Ce), NB(WO), PbF2, PWO, SrI2(Eu), YAG(Ce), YAP(Ce), YSO(Ce), ZnSe(Te), CsI—Tl, CWO, Nd:YAG.

BRIEF DESCRIPTION OF THE DRAWINGS

For a better understanding of the present disclosure, reference is made to the accompanying drawings, in which like elements are referenced with like numerals, and in which:

FIG. 1A illustrates a representative nanophotonic environment;

FIG. 1B shows the high-energy particle energy loss densities;

FIG. 1C shows various types of microscopic emitters;

FIG. 1D shows the effect that the effective volume has on the shape of the emitter's radiation spectrum;

FIGS. 1E-1F show the principle of electromagnetic reciprocity;

FIG. 1G shows the principal elements of a framework to calculate scintillation in the nanophotonic structure shown in FIG. 1A;

FIG. 2B shows the energy loss density as a function of the penetration depth;

FIG. 2C shows scanning electron micrograph images of the pattern (a two-dimensional periodic photonic crystal);

FIG. 2D shows spectra from patterned and unpatterned samples;

FIG. 2E shows a zoom-in of FIG. 2C;

FIGS. 2F-2G show a comparison of experimental spectrum vs. theoretical spectrum;

FIG. 3A shows the scintillation spectrum, when excited by HEP of various energies;

FIG. 3B shows a schematic of the four-level system used to describe the scintillation mechanism and the microscopic structure of the self-trapped hole defect;

FIG. 3C shows how this system can be used to predict the ratio of green to red scintillation energy as a function of the deposited beam power;

FIG. 3D shows the predicted scintillation spectrum from density functional theory calculations;

FIG. 3E shows a comparison of measured and predicted scintillation peak ratios (green to red) as a function of deposited beam power in patterned and unpatterned samples;

DETAILED DESCRIPTION

Figure 2A:
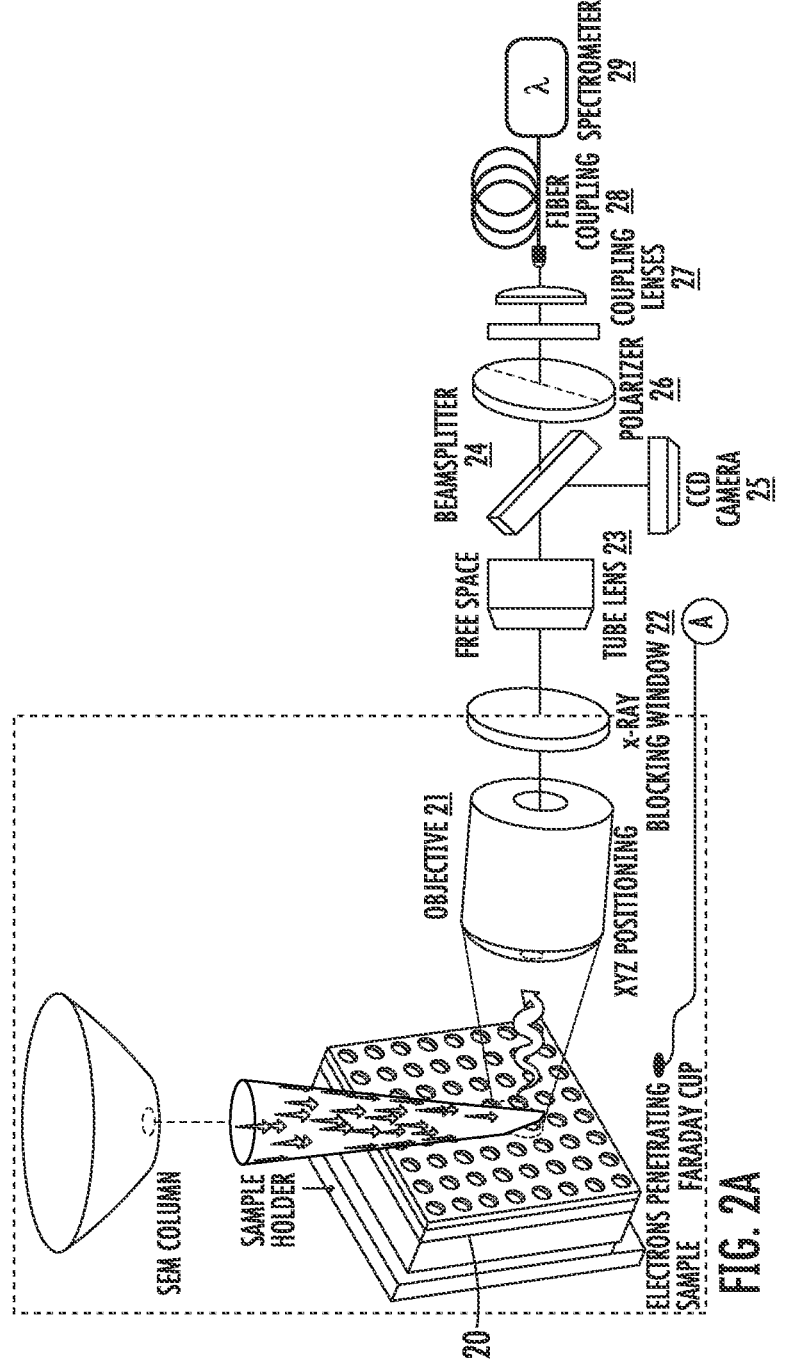
FIG. 2A shows a test measurement configuration.

According to one embodiment, optical structures having improved scintillation are disclosed. To create these structures, it is first necessary to describe a framework by which the scintillation of a structure optical environment can be modeled.

This framework may be used to model, control, and enhance scintillation (light produced by materials bombarded with high-energy particles). Such particles include, but are not limited to high-energy electrons (beta particles), photons (ultraviolet photons, X- and gamma-rays), and alpha and beta particles. Scintillation is also taken advantage of in neutron detectors (e.g., in detectors where a neutron interacts with another atom, such as $^6$Li, such that one of the reaction products is a charged particle such as an alpha particle). Scintillation, incoherent cathodoluminescence (scintillation by energetic electrons), and photoluminescence obey very similar physics, therefore the framework applies to all of them.

The fundamental physics associated with this disclosure is the identification of using field enhancement or absorption enhancement in nanophotonic structures to enhance the optical emission of scintillator materials, enabling thinner scintillators (with higher resolution), brighter scintillators, and faster scintillators.

The general scenario that is considered is shown in FIGS. 1A-1B. A beam 10 of high-energy particles (HEP) irradiates a nano-patterned optical structure 11 with features on the nano- or micron-scale and total dimensions from nanometer to centimeter scale. The features may have dimensions between 10 nm and 10 microns. Such structures, due to their small features, are henceforth referred to as nanophotonic structures. FIG. 1C shows various types of microscopic emitters, including intraband transitions 12, interband transitions 13 and defect states 14. FIG. 1A shows a representative nanophotonic environment. Examples of such structures 11 include photonic crystals, resonators, multilayer thin films, photonic quasicrystals, plasmonic and polaritonic systems, and so on. Energy from the HEP beam 10 is transferred to the material and converted to radiation through a process of ionization, followed by thermalization and recombination—the last step leading to the light emission. The total radiation can be modelled as the emission of a set of temporally-fluctuating and incoherent dipoles with spectral correlations governed by the material being irradiated.

FIG. 1B shows the high-energy particle energy loss densities. Based on this, an effective volume can be used to spectrally shape the emitter's radiation spectrum, as shown in FIG. 1D. HEPS impinging on materials lose energy through inelastic scattering with the crystalline lattice. Depending on the materials and characteristics of HEP, such as mass, charge, energy, angle of incidence, and others, the resulting energy loss will be converted in radiation through a complicated cascade of processes. In materials that are doped or hosting defect states, the overlap between the energy loss and volume hosting such dopants/defects is relevant to the theory presented herein. In materials where emission is mediated by the radiative recombination of electron-hole pairs, additional diffusion processes may be relevant to describe the effective volume.

The framework relies on Lorentz-reciprocity in electromagnetism, which is shown in FIGS. 1E-1F. As illustrated, electromagnetic reciprocity 15 is used to calculate far-field radiation 16 from the stochastic many-body ensemble in a single plane-wave scattering electromagnetic simulation. In this way, radiation can be predicted by calculating the induced field in the structure from a plane wave incident from the far-field at the angle and frequency and polarization for which the emission will be calculated.

Returning to FIG. 1A, a material with scintillating centers is shown. These scintillating centers may be associated with defects in the material, electron-hole recombinations in semiconductors, excitons and other mechanisms. These centers may be generated optically, as in photoluminescence, or via electron beam, as in the case of incoherent cathodoluminescence, or via ionizing radiation, such as X- and gamma-rays. In all cases, the spontaneous radiation associated with these emitters may be considered as a type of non-equilibrium radiation from fluctuating currents $J(r, \omega)$ in the material, where r is a three-dimensional position vector in the structure, and $\omega$ a frequency of interest. These fluctuating currents are governed by the non-equilibrium occupation function of the electrons, which is defined as $f\alpha$, where $\alpha$ is the quantum states of the system.

In many cases of cathodoluminescence, there is a separation of time scales between the processes that create the excited scintillating centers, and the recombination that leads to radiation. In particular, the process of impact ionization of an electron, followed by relaxation to the lowest unoccupied states of the systems occurs on timescales that are much shorter than the spontaneous emission, which in many systems, occurs on timescales between microseconds and nanoseconds.

Consequently, the scintillating system may be modelled as being in a non-equilibrium steady states, and so the occupation functions which given the correlation functions of the fluctuating current, remain well defined. In that case, the normally-ordered correlation function between different components of the current is given by:

$$\langle J_j^-(r_1, \omega) J_k^+(r_2, \omega) \rangle =$$

$$2\pi T \sum_{\alpha,\beta} J_j^{\alpha\beta}(r_1) J_k^{\beta\alpha}(r_2) f_\alpha (1 - f_\beta) \delta(\omega - \omega_{\alpha\beta}) \equiv 2\pi T S_{jk}(r_1, r_2, \omega)$$

where T is a normalization time and $$J_k^{\alpha\beta}(r)$$

is the matrix element of the k-component of the current operator between quantum states $\alpha$ and $\beta$, and S a proxy for the frequency-dependent correlation function. This formula describes frequency-dependent correlations of the fluctuating currents produced by the HEP in the scintillator. This mathematical formalism allows modelling of currents induced by stochastic sources, as is the case in scintillation. Statistical fluctuations are necessary to describe scintillation because of the random nature of the energy loss process from HEP.

From this, it follows that the radiated intensity spectrum in the far-field, which is given in terms of the normally-ordered correlation functions of the electric fields is:

$$\frac{dI(r)}{d\omega} = \frac{2\mu_0\omega^2}{c} \int d^3 r_1 d^3 r_2 G_{ij}^*(r, r_1, \omega) G_{ik}(r, r_2, \omega) S_{jk}(r_1, r_2, \omega)$$

where $G_{ij}(r, r_1, \omega)$ is the ith component of the electric field at position r and frequency $\omega$ of a dipole at position $r_1$ oriented along direction j.

The current fluctuations may be assumed to be local, such that $S_{jk}(r_1, r_2, \omega) = S_{jk}(r_1, \omega)\delta(r_1-r_2)$. In this case, the above equation may be reduced to:

$$\frac{dI(r)}{d\omega} = \frac{2\mu_0\omega^2}{c} \int d^3r_1 \, G_{ij}^*(r, r_1, \omega) G_{ik}(r, r_1, \omega) S_{jk}(r_1, \omega)$$

In reciprocal electromagnetic systems, $G_{ij}(r, r_1, \omega) = G_{ji}(r_1, r, \omega)$, thus relating the power to the field emitted by a dipole at position r, which is taken to be in the far-field. If $G_{ji}(r, r_1, \omega)$ is defined as $\alpha E G_j(r_1, r, i, \omega)$ where $\alpha$ is a proportionality constant, the previous equation can be translated into the power spectrum per unit solid angle $$\left( \frac{dP}{d\omega d\Omega} \right)$$

as follows:

$$\frac{dP}{d\omega d\Omega} = \frac{\omega^2}{8\pi^2\varepsilon_0 c^3} \sum_i \int d^3r' \frac{E_j^*(r', i, \omega, \Omega)}{|E_{inc}(i, \omega, \Omega)|} \frac{E_k(r', r, i, \omega)}{|E_{inc}(i, \omega, \Omega)|} S_{jk}(r', \omega)$$

where $|E_{inc}(i, \omega, \Omega)|$ is defined as the magnitude of the field of a dipole emitting from the far-field at frequency $\omega$ and coming from angle $\Omega$, which is $$\left| \frac{\alpha}{4\pi R} \right|$$

with $R = |r - r'|$. Since the scintillating material is far from the detector, this field is equivalent to a plane wave incident from the far field at an angle set by r.

In the case where the scintillating material is isotropic, $S_{jk}(r', \omega) = \delta_{jk} S(r', \omega)$. This reduces the above equation to:

$$\frac{dP}{d\omega d\Omega} = \frac{\omega^2}{8\pi^2\varepsilon_0 c^3} \sum_i \int d^3r' \left| \frac{E(r', i, \omega, \Omega)}{E_{inc}(i, \omega, \Omega)} \right|^2 S(r', \omega).$$

From the above equation, it can be seen that the emitted power is proportional to the field enhancement by a plane wave at frequency $\omega$, incident from direction $\Omega$, inside a volume governed by the scintillating material. This is also proportional to the absorbed power of the plane wave. In particular, if instead of S, Im $\varepsilon$ was used in the previous equation, it is clear that it would be directly proportional to the absorbed power. The spectral function $S(\omega)$ is set by the microscopic properties of the material, such as current, dipole and matrix elements, and the properties of the pump beam, the latter of which sets the spatial distribution of S and the occupation functions, which in turn controls the frequency dependence of S. for a fixed pump, maximizing luminescence corresponds directly to maximization of the absorbed power in the volume set by the distribution of luminescing material.

If S is assumed to be independent of position in the scintillating volume (over which the integral is calculated), then the above equation may be written as $$\frac{dP}{d\omega d\Omega} = \frac{\pi}{\varepsilon_0\omega} * S(\omega) * \left( \frac{V_{eff}(\omega)}{\lambda^3} \right)$$

wherein $V_{eff}$ is the effective volume of absorption or field enhancement.

This expression indicates that the spectrum is a simple product of a microscopic factor, set by the non-equilibrium steady-state distribution function, and an effective absorption volume, which is set only by the structured optical medium surrounding the luminescing medium. This expression also allows inference of the microscopic spectral function $S(\omega)$, given knowledge of $V_{eff}$ and a measurement of the spectrum.

Further, the previous two equations provide for the computation of a single absorption map, also referred to as $V_{eff}$. In other words, $$V_{eff}^{(\sigma)}(\omega, \Omega) \equiv \int_{V_l} dr \left| \frac{E^{(\sigma)}(r, \omega, \Omega)}{E_{inc}^{(\sigma)}(\omega, \Omega)} \right|^2$$

Wherein $V_l$ denotes the scintillating volume, $$E_{inc}^{(\sigma)}(\omega, \Omega)$$

is the magnitude of the field (at location r) of a $\sigma$-polarized plane wave at frequency $\omega$. The field $E^{(\sigma)}(r, \omega, \Omega)$ is the spatially-dependent induced field resulting from the plane wave excitation.

This model gives a very strong level of agreement with experimental measurements of scintillation from electrons.

FIG. 1G shows the framework description above. The framework takes in a plurality of inputs 17, which include type of material and its geometry, along with information about the HEP beam, such as energy and direction. The framework can then utilize one or more methods 18 to generate the outputs 19.

Specifically, in certain embodiments, the framework may utilize a Monte Carlo Energy Loss model, as shown in FIG. 1B. The output of that component of the framework is a spatially-dependent energy loss density of the incident HEP beam.

In another embodiment, the framework may utilize a full wave nanophotonics method as shown in FIG. 1D. The output of that component of the framework is a map of the field enhancement $$\frac{E^{(\sigma)}(r, \omega, \Omega)}{E_{inc}^{(\sigma)}(\omega, \Omega)}.$$

In another embodiment, the framework may utilize density functional theory (DFT) and rate equations as shown in FIGS. 1C and 3C. The output of that component of the framework may be the spectral distribution of the emitters (spectral dependence of $S(r, \omega)$).

By combining the outputs of those methods according to the theory provided in the previous sections, one can calculate the scintillation power spectrum density $$\frac{dP}{d\omega d\Omega}.$$

FIG. 1G also illustrates parts of the framework that can be differentiated. This means that derivatives of the outputs (and thereby of the scintillation power spectrum) can be calculated with respect to the inputs.

FIG. 2A shows a test measurement configuration to record cathodoluminescence from a particular sample. The sample 20 is subjected to an electron beam. The sample 20 is a SOI photonic crystal comprising 500 nm of silicon disposed on top of one micron of silica and a silicon substrate having a thickness of about 500 nm. In one test, the sample was unpatterned. An objective lens 21, which may have XYZ positioning, is positioned to receive emissions from the sample 20. An X-ray blocking window 22 may be disposed downstream from the objective lens. A tube lens 23 may be disposed downstream from the X-ray blocking window 22. A beamsplitter 24 is used to split the incoming signal. A portion of the signal is received by photodetector, such as a CCD camera 25. The other portion of the signal passes through a polarizer 26, coupling lenses 27, a fiber coupling 28 and enters a spectrometer 29.

Based on the geometry of the sample and the equations recited above, a model of the expected scintillation can be computed. FIGS. 2F-2G show the experimental spectrum as compared to the theoretical spectrum derived using the framework described above. The different lines represent different configurations of the sample 20. The different lines represent differing depths the cavities on the sample 20. The line labeled thin film shows an unpatterned sample having the same thickness. Note that the level of agreement between these graphs is very high. To calculate scintillation in this spectrum, we used Monte Carlo simulations of the electron energy loss density, shown in FIG. 2B. Micrographs of the measured scintillator are shown in FIGS. 2C and 2E.

Note that with this configuration, two types of microscopic defects can scintillate, which are referred to as "green" and "red" peaks due to their characteristic emission frequencies. Both originate from silica defect "Self-Trapped Hole 1" (STH 1). The red peak acquires a double-peak spectral shape when the scintillation is into this multilayer structure. This is in contrast with measurements of silica scintillation in bulk, which is singly-peaked: the double-peaked structure is captured by the $V_{eff}$ defined in the theory. The shaping of the green peak, which is also a single-peak in bulk measurements, is multiply-peaked, again corresponding to $V_{eff}$. In both cases, the scintillation spectra are spectrally shaped by the thin film resonance.

A computer program, disposed on a non-transitory storage medium, may be created to allow for automation of the framework. This computer program may be executed by a processing unit. The processing unit may be a computer, laptop computer, tablet, server or other suitable device. The computer program is provided with the equations described above and instructions needed to solve these equations. In one embodiment, the computer program may be provided with the dimensions and composition of the sample. In response to this input, the computer program may generate an expected spectrum and angular response. This is how the theoretical graphs shown in FIGS. 2F-2G were generated. The computer program may also be able to calculate the HEP energy loss given the HEP properties (energy, angle of incidence, charge, mass, etc.) and the sample geometry (thicknesses, patterning, etc.). The computer program may also be able to calculate intrinsic properties of the scintillating material, such as the intrinsic scintillation yield, the scintillation wavelength, spectral bandwidths and linewidth. The computer program may also be able to calculate the electromagnetic fields induced in the device based on the equations provided above. The computer program may also be able to simulate the scintillation signal measured by a detector (a camera, a photodiode, a photomultiplying device, etc.) and to process the signal with signal or image processing algorithms.

Further, in another embodiment, the computer program may be provided with the dimensions and composition of the sample and may also be adapted to modify the geometry of the volume. After making each modification, the computer program may generate the expected spectrum. In a further embodiment, the computer program may be adapted to repeat the modifying and generation steps in an attempt to achieve a desired result, or Figure of Merit, such as a maximum intensity at a particular frequency and/or angle and/or polarization of emission. This latter embodiment may be achieved by adapting the computer program to calculate gradients of the desired result with respect to continuous degrees of freedom of the structure (such as dimensions and/or composition of the structure).

As an example, in this embodiment, a specific Figure of Merit; the maximization of $$FOM = V_{eff}^{(\sigma)}(\omega, \Omega),$$

at a specific $\omega$, $\Omega$ and $\sigma$, is described. Note that the technique applies to all Figures of Merit mentioned below. A computer program is able to calculate the "forward problem", that is, to compute FOM given the material and geometrical parameters describing the scintillating structure. This is achieved by calculating the induced electromagnetic fields by plane waves incident on the structure (using some solver of Maxwell's equations at some level of approximation, such as finite difference time domain methods, finite-difference frequency-domain methods, finite element methods, rigorous coupled-wave approximations, etc.), and using the previously described framework and equations to relate those Maxwell equations solutions to the scintillation.

The computer program may also able to calculate other relevant physical parameters to completely model the system, such as the distribution of HEP energy loss given the HEP characteristics and the properties of the bulk scintillation (from unpatterned substrates).

If the computer program is only able to calculate the "forward problem", it may still be plugged into gradient-free optimization algorithms, such as genetic and hereditary heuristic optimization algorithms.

Additionally, the computer program may be able to calculate the gradient or sensitivity matrix of the FOM, corresponding to local variations of the FOM with respect to material and geometrical degrees of freedom of the structure. This gives information on whether small variations of a given degree of freedom may locally increase or decrease the FOM, an essential ingredient to any gradient-based optimization algorithm. Methods to calculate the gradient and other relevant high-order derivatives of the FOM with respect to degrees of freedom include: automatic differentiation libraries, adjoint methods, and finite-difference approximation schemes. Once the computer program is endowed with gradient calculation capabilities, gradient-based optimization algorithms can be used to optimize the value of FOM. At every algorithm step, the "forward problem" solver calculates the current value of the FOM and gradient with respect to every single degree of freedom. Based on this information, it can determine local variations of the degrees of freedom (e.g. modifying the shape of the structure) to optimize the FOM. The optimization algorithms operate iteratively until a local optimum of the FOM is reached.

Optimization algorithms that can be used to optimize the performance of scintillating materials include, but are not limited to: (stochastic) gradient descent, the method of moving asymptotes, sequential quadratic programming techniques, and Newton methods.

Using the framework above, the following "desired results" or Figures of Merit may be optimized:

maximizing the effective volume of absorption in the scintillating material at one or more given frequencies and/or angles and/or polarizations of interest, such that the effective volume may be increased by at least 10%, 20%, 50%, 75%, 100%, 200%, or 1000%;

maximizing the scintillating emission at one or more given frequencies and/or angles and/or polarizations of interest maximizing the local density of photonic states in the scintillating material, such that the local density may be increased by at least 10%, 20%, 50%, 75%, 100%, 200%, or 1000%;

maximizing the total scintillating emission;

maximizing the overlap between the HEP energy loss and the scintillating material, such that the overlap may be increased by at least 10%, 20%, 50%, 75%, 100%, 200%, or 1000%.

maximizing the speed of emission;

minimizing the thickness required to achieve a given scintillation yield, such that the required substrate thickness may be decreased by at least 10%, 20%, 50%, 75%, 90% or 95%;

minimizing the dose (amount of impinging HEP) to achieve a desired scintillation yield, such that the required dose may be reduced by at least 10%, 20%, 50%, 75%, or 90%;

optimizing (maximizing or minimizing) one of the above desired results, taking into account additional signal/image processing steps performed by a computer on the detected scintillating signal. In other words, since the framework allows the modeling of the entire physical mechanism from the impinging HEP to the scintillating device and potential additional signal/image processing steps, the entire device may be optimized "end-to-end" for any given desired result.

Using the framework described above, the maximum emission can be moved to a different frequency. Further, the energy of scintillation emission into red photons can be enhanced by a factor of five by patterning the structure with a photonic crystal (air holes in silicon on a silica-silicon substrate), as shown in FIG. 2D. In this test, the particular photonic crystal has shallow air holes having a diameter of 260 nm. One of the lines in the graph shows a test where the air holes had a depth of 25 nm. A second line shows a test where the depth was 35 nm, and in third line, the depth was 45 nm. In all embodiments, the period of the crystal is 430 nm. Finally, the fourth line shows the spectrum of an unpatterned sample.

Using the framework described above, the emission at a given wavelength and/or (set of) angle (s) can be maximized. Further, the energy of scintillation emission into red photons can be enhanced by a factor of 11 by patterning the silicon layer with the arbitrary cross-shaped pattern shown in FIG. 4A-4B. In other 2D embodiments shown as insets in FIG. 4C (patterned air holes in silicon layer on silicon-silica substrate on an aluminum substrate) the scintillation emission can be enhanced (1) at a single frequency in the green part of the visible spectrum (green line) by a factor of 86 compared to the unpatterned sample (leftmost insert); (2) at a single frequency in the red part of the visible spectrum (light red line) by a factor of 78 compared to the unpatterned sample (middle insert); over the bandwidth of a scintillating defect in the red part of the visible spectrum (dark red line) by a factor of 30 (rightmost insert).

The amount of enhancement is a function of the photonic crystal geometry, which in this embodiment, is the depth of the holes in the pattern. This enhancement also translates into faster scintillation, as compared to the thin film sample. Higher yield and faster scintillation enable high-energy particle detectors with higher sensitivity, higher time resolution, and better energy resolution—all of which are in high demand for most scintillation applications.

The experimental observation of enhancement is also confirmed by a four-level system rate equation model which reproduces faithfully the dependence of the enhancement of green peak to red peak as a function of the high-energy particle current bombarding the structure, as shown in FIGS. 3A-3C. FIG. 3A shows the scintillation spectrum, when excited by HEP of various energies. FIG. 3B shows a schematic of the four-level system used to describe the scintillation mechanism. FIG. 3C shows how this system can be used to predict the ratio of green to red scintillation energy as a function of the deposited beam power in the scintillating structure, and the structure geometry.

FIG. 3D shows calculations of the spectrum from scintillation defects using DFT. For this specific system, the emission is mostly coming from two peaks centered around 500 and 650 nanometers.

FIG. 3E shows measured and predicted ratios of scintillation peaks as a function of deposited beam power in the scintillator structure.

Furthermore, as described above, the computer program enables the inverse-design of arbitrary nanophotonic structures to optimize their performance at a given frequency, angle, or polarization of interest.

Figures 4A, 4B, 4C:
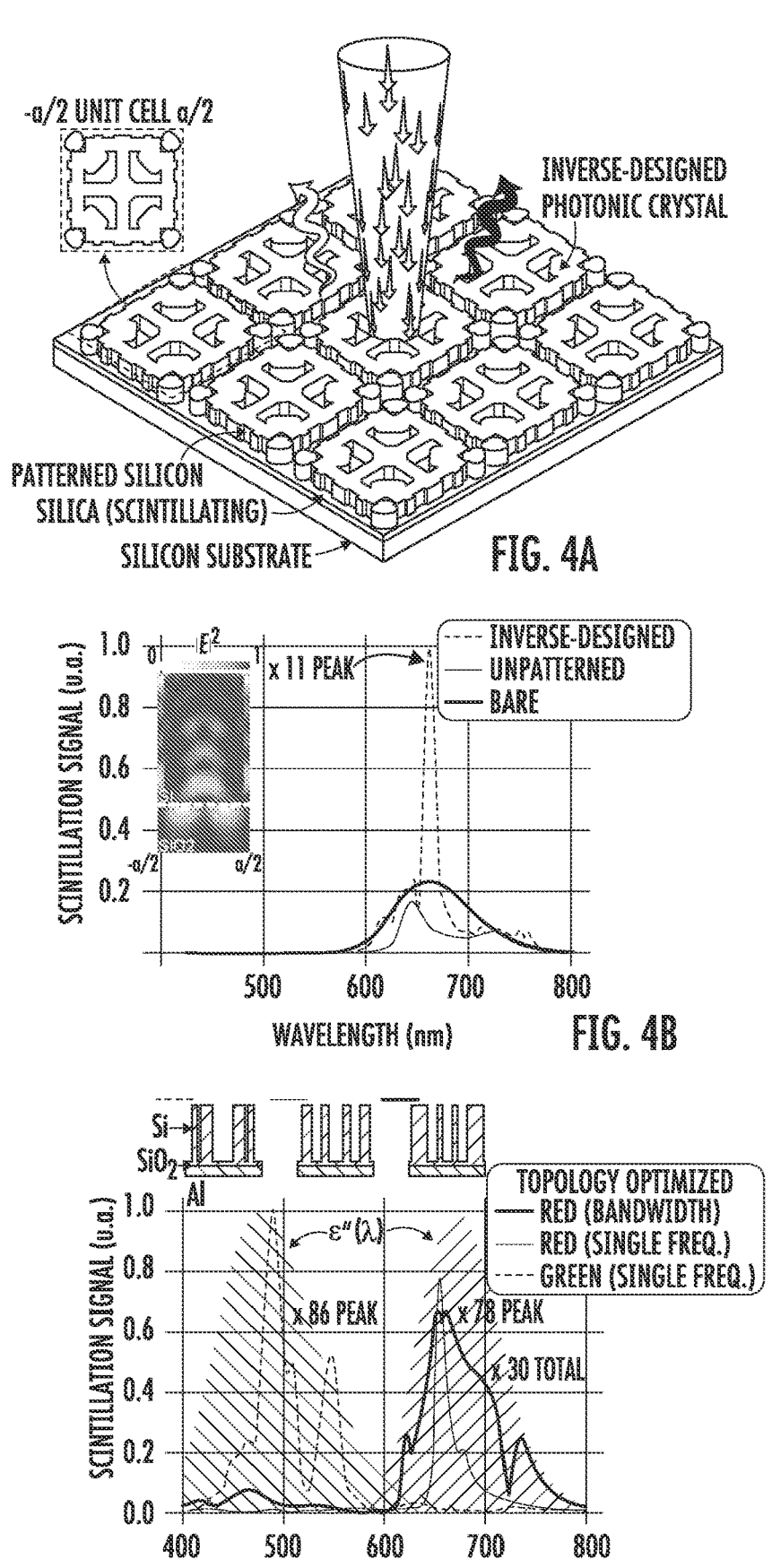
FIG. 4A shows an electron beam impacting a patterned scintillator.
FIG. 4B shows the effective volume of the scintillator as a function of wavelength, as compared to an unpatterned and a bare scintillator.
FIG. 4C shows the gain in luminescence that may be achieved with patterning.

For example, FIG. 4A shows an electron beam irradiating a silicon-on-silica photonic crystal in which the permittivity of the unit cell is inverse-designed to maximize the scintillation yields into green and red light.

FIG. 4B shows the effective volume as a function of wavelength for unpatterned, bare multilayer, and inverse-designed structures, showing an 11-fold enhancement of the red luminescence. As shown in FIG. 4C, the inverse designed Si photonic crystal structures allow optimization of the enhancement at green and red wavelengths, potentially yielding 90-fold enhancement of the luminescence. This type of design technique allows account fabrication constraints to be taken into account in order to get maximum scintillation yield for a given detector fabrication constraint.

Figure 5:
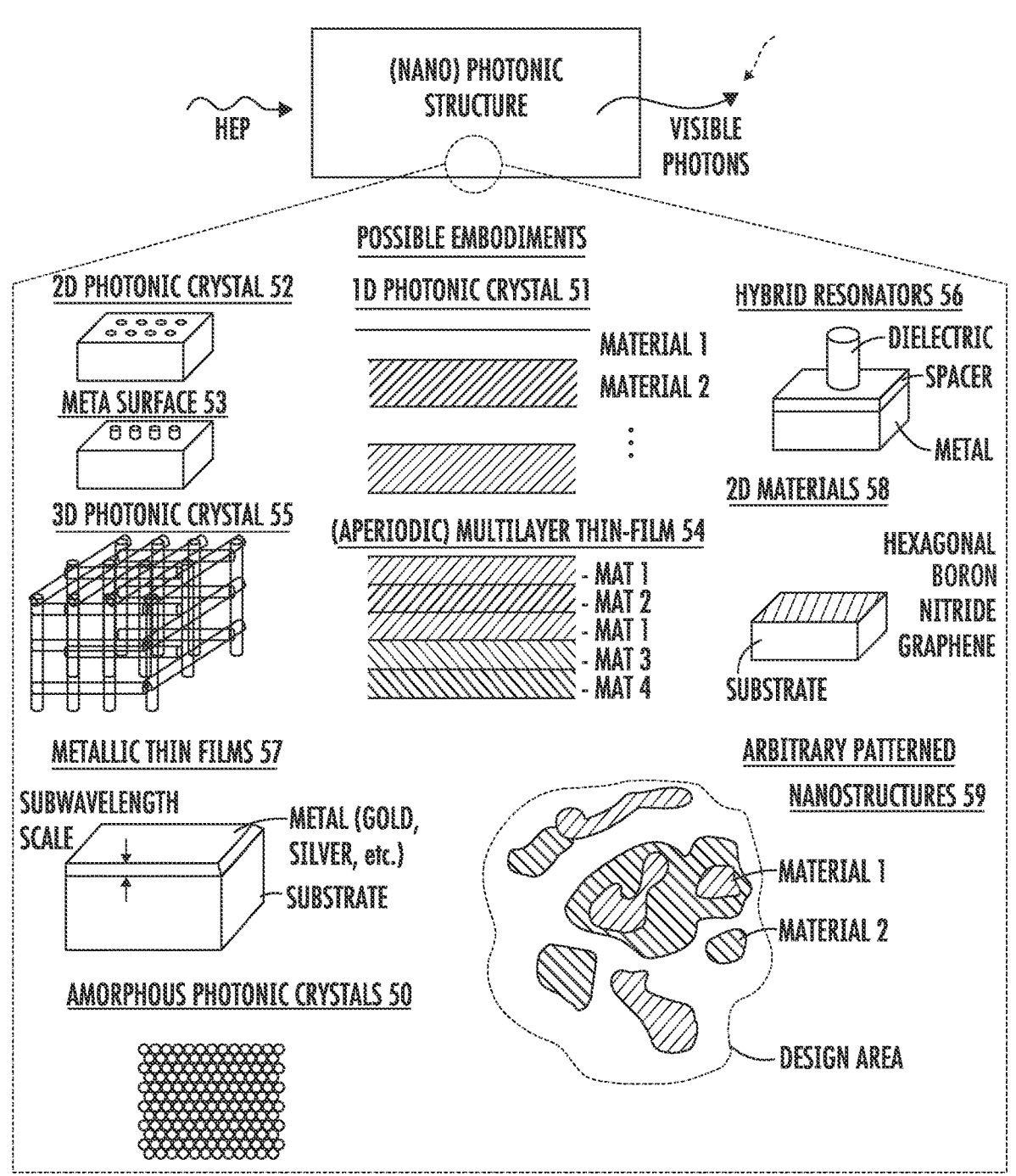
FIG. 5 shows a plurality of techniques that may be used to create the nanophotonic scintillator.

The geometric features of the nanophotonic scintillator may be specific to each application. Further, the nanophotonic scintillator may be fabricated using a plurality of techniques, some of which are shown in FIG. 5 and described below.

In certain embodiments, the scintillators may be formed using a one-dimensional photonic crystal 51, which may include a periodic arrangement of thin film layers, whose thicknesses vary between 5 nm and 100 microns.

In another embodiment, the scintillator may comprise two-dimensional photonic crystals 52 and metasurfaces 53, which may include a two-dimensional periodic arrangement of holes, pillars, posts, cylinders, squares, extruded structures or any arbitrary patterns, where the periodicity varies between 5 nm and 100 microns, and each thickness varies between 5 nm and 100 microns, wherein the total thickness being a function of the HEP energy.

In another embodiment, the scintillator may comprise a multi-layer thin film 54, comprising a non-periodic arrangement of thin film layers, whose thicknesses vary between 5 nm and 100 microns.

In another embodiment, the scintillator may be a 3D Photonic crystal 55, comprising a three-dimensional periodic arrangement where the feature size is smaller than the period, and the period itself varies between 5 nm and 100 microns.

In another embodiment, a hybrid metallic-dielectric resonator 56 may be utilized. This configuration may comprise a dielectric resonator (pillar, hole, or arbitrary pattern) on top of a spacer thin film (metallic or dielectric), on top of a metallic substrate, where each layer thickness and feature size varies in the range 5 nm to 100 microns. The structure may be periodic or not, and may comprise a periodic or aperiodic array of holes, squares, posts, cylinders or other extruded structures having a dimension of 10 nm to 10 microns.

In another embodiment, the scintillator may be a metallic thin film 57. This is similar to the previous embodiment, but with a metallic spacer of smaller thickness, such as from 0.1 to 500 nm. In certain embodiments, the metallic thin film can be directly deposited on top of a scintillating material. The metallic thin film may have a thickness between 1 nm and 1000 nm. In other embodiments, the metallic thin film can be embedded in a scintillating material matrix. The metallic thin film can be patterned with patterns on the wavelength scale, such as 50 nm-5 microns.

In another embodiment, the scintillator may comprise a two-dimensional material 58 such as hexagonal boron nitride, graphene or molybdenum disulphide deposited on a substrate. The two-dimensional material may be single-layer or a few layers. The two-dimensional material may comprise a periodic or aperiodic array of holes, squares, posts, cylinders or other extruded structures having a dimension on the nano- or microscale, such as between 10 nm and 10 microns.

In another embodiment, the scintillator may comprise an arbitrary patterned nanostructure 59, whose topology and/or dielectric distribution is optimized through inverse-design (to enhance the scintillation yield). The resulting structure may not be periodic. The typical feature size of such structures may vary between 5 nm and 100 microns.

In another embodiment, the scintillator may comprise an amorphous photonic crystal 50, which may comprise a locally-periodic arrangement, made of, for instance, colloidal particles. The structure may not present a long-range order. The typical feature size of such structures may vary between 5 nm and 100 microns.

In all of the above embodiments where the scintillator comprises a periodic patterned nanostructure, it is noted that the case where the structure has a single unit cell is also of interest (single nanoresonator, in the form of a sphere, cylinder, rectangular post, or arbitrary shape with feature size 10 nm-10 microns). Thus, in all of the above embodiments, a scintillator wherein the patterned nanostructure comprises a single sphere, cylinder, post, cylinder, square, or extruded structure is also disclosed.

A variety of fabrication techniques may be utilized to create the inverse-designed scintillator. In one embodiment, a resist material is deposited on top of a thin film scintillator. A lithography step is then performed, during which the resist is exposed to a beam of light, electrons, or ions, writing the desired pattern on it. The pattern is then etched into the scintillator material through methods including, but not limited to: plasma etching, deep reactive ion etching, reactive ion etching, inductively coupled plasma etching, or chemical etching.

In another embodiment, the fabrication technique may be similar to that described above, but rather than a thin film, the resist is applied to a semiconductor or dielectric material, such as Si, $SiO_2$, $Al_2O_3$, $Si_3N_4$. This is followed by a filling step, where a melt of the scintillating material penetrates the etched holes in the semiconductor or dielectric material. Finally, a planarization or mechanical polishing step is realized to flatten the surface of the sample.

In another embodiment, the same technique as described above is used, except the roles of the scintillator material and non-scintillating material are switched, such that the non-scintillating material fills a matrix of scintillating material.

In yet another embodiment, the same technique described above is used, except both materials are scintillating, or more than two scintillating materials are used.

In some embodiments, the photonic structure can be made from a scintillating material itself, serving both the role of the scintillator and the structure. In this way, the scintillator matrix is only filled by air/vacuum).

In another embodiment, nanoimprinting is used. In this technique, a sample with the complementary pattern is fabricated with other fabrication techniques in another material (e.g., Si, $SiO_2$, $Al_2O_3$, $Si_3N_4$), and used to imprint the desired pattern in the scintillating material by mechanical deformation and subsequent processes.

Some of the above-mentioned fabrication embodiments also apply to other scintillator photonic structures, such as hybrid metallic-dielectric resonator, two-dimensional material, arbitrary patterned nanostructure, 3D photonic crystals, and others.

There are various materials that may be utilized to construct the scintillator. Materials of interest due to their nanophotonic properties and/or scintillation properties, include but are not limited to:

Silicon, silicon dioxide (crystalline and amorphous), rare-earth doped silicon or silica Dielectric thin films, such as: $SiO_2$, $TiO_2$, $Ta_2O_5$, $Al_2O_3$, $HfO_2$, $V_2O_5$, $VO_2$, Ago, Mgo Boron nitride (hexagonal and cubic), graphene Transition metal dichalcogenides Quantum dot and quantum well materials (e.g., CdS, AlGaAs)

Large-bandgap material such as diamond, boron nitride, AlN

Semiconducting materials such as GaAs, GaP, GaN, GaInN and quantum well structures (multilayer of $GaN/In_xGa_{1-x}N$ for instance)

Metals (and rare earths): Ag, Ta, Ni, Fe, Cr, Cu, Co, FeMn, V, Hf, Gd, Sc, Zn, Sn, Mn, TiN, TaN, Ti, Au, (and Er, Ce, Sc, Y, La, Pr, Nd, Pm, Sm, Eu, Gd, Tb, Dy, Ho, Tm, Yb, Lu)

Nitride thin films such as AlN, SiN, HEN, GaN (doped or not), InGaN, AlGaN

Perovskite materials (for instance MAPbX3 and CsPbX3 where X=Br, Cl, I) and perovskite quantum dots or nanocrystals Heavy materials (large Z)-doped dielectric and semiconductor structure (silica, silicon, alumina, titanium dioxide, etc.)

Materials known for their scintillation properties (doped or undoped): NaI, BGO, LSO, YSO, GSO, BaF2, CaF2, CeBr3, Chromox, CLYC, CsI, CsI(Na), CsI(Tl), GGG, GAGG(Ce), GFAG(Ce), LaBr3(Ce), LBC, LSO (Ce), LuAG(Ce), LuAG(Pr), LuAP(Ce), LYSO(Ce), NB(WO), PbF2, PWO, SrI2(Eu), YAG(Ce), YAP(Ce), YSO(Ce), ZnSe(Te), CsI—Tl, CWO, Nd:YAG It is noted that that some of the aforementioned materials, such as silica, which are composed of relatively light elements, while capable of scintillating, are often not considered as "scintillator materials" conventionally, because they have relatively low stopping power, and thus do not accept very much of the energy of ionizing radiation. However, the disclosed method for enhancing the optical yield of these materials allows them to emit comparably to heavier materials, and thus can serve as viable scintillating materials.

By utilizing the inverse design approach, various figures of merit can be improved.

For example, the local density of photonic states, measuring the density of photonic states allowed in the structure at a given energy/frequency and position, may be improved by a factor of at least 1.1, compared to a conventional, non-patterned scintillator. In certain embodiments, the local density of state may be improved by a factor of at least 1.2. In certain embodiments, the local density of states may be improved by a factor of at least 1.5. In certain embodiments, the local density of state may be improved by a factor of at least 2. In certain embodiments, the local density of state may be improved by a factor of at least 5. In certain embodiments, the local density of state may be improved by a factor of at least 10.

Additionally, the effective absorption volume may be enhanced by a factor of at least 1.1, as compared to a conventional, non-patterned scintillator. In certain embodiments, the effective absorption volume may be enhanced by a factor of at least 1.2. In certain embodiments, the effective absorption volume may be enhanced by a factor of at least 1.5. In certain embodiments, the effective absorption volume may be enhanced by a factor of at least 2. In certain embodiments, the effective absorption volume may be enhanced by a factor of at least 5. In certain embodiments, the effective absorption volume may be enhanced by a factor of at least 10.

In structures comprised of multiple materials, some of which scintillating, the scintillation emission is proportional to the overlap between the HEP energy loss volume and the scintillating materials. Furthermore, the overlap between the HEP energy loss and the scintillation materials may be enhanced by a factor of at least 1.1, as compared to a conventional, non-patterned scintillator. In certain embodiments, the overlap may be enhanced by a factor of at least 1.2. In certain embodiments, the overlap may be enhanced by a factor of at least 1.5. In certain embodiments, the overlap may be enhanced by a factor of at least 2. In certain embodiments, the overlap may be enhanced by a factor of at least 5. In certain embodiments, the overlap may be enhanced by a factor of at least 10.

In many applications, such as high-resolution X-Ray imaging, the directivity of the scintillation emission is of paramount importance—defined as the ratio of scintillation radiation emitted towards a specific angular aperture to the total scintillation radiation.

In certain embodiments, the directivity of scintillation (for instance, toward one specific direction where the detector lies) may be enhanced by at least 10%, as compared to a conventional, non-patterned scintillator. In certain embodiments, the directivity is enhanced by at least 20%. In certain embodiments, the directivity is enhanced by at least 50%. In certain embodiments, the directivity is enhanced by at least 75%. In certain embodiments, the directivity is enhanced by at least 100%. In certain embodiments, the directivity is enhanced by at least 200%. In certain embodiments, the directivity is enhanced by at least 500%. In certain embodiments, the directivity is enhanced by at least 1000% or more.

In certain embodiments, the required thickness of a given scintillator to achieve a predetermined scintillation yield (i.e. a predetermined number of scintillation photons) is decreased by at least 10%, as compared to a conventional, non-patterned scintillator. In certain embodiments, the required thickness is decreased by at least 20%. In certain embodiments, the required thickness is decreased by at least 50%. In certain embodiments, the required thickness is decreased by at least 75%. In certain embodiments, the required thickness is decreased by at least 90%. In certain embodiments, the required thickness is decreased by at least 95%.

In certain embodiments, the incident dose of high energy particles required to achieve a desired scintillation yield is reduced by at least 10%, as compared to a conventional, non-patterned scintillator. In certain embodiments, the required dose is decreased by at least 20%. In certain embodiments, the required dose is decreased by at least 50%. In certain embodiments, the required dose is decreased by at least 80%. In certain embodiments, the required dose is decreased by at least 90%. In certain embodiments, the required dose is decreased by at least 95%.

In certain embodiments, the collection time of the scintillation needed to achieve a signal of a predetermined strength and quality is decreased by at least 10%, as compared to a conventional, non-patterned scintillator. In certain embodiments, the required collection time is decreased by at least 20%. In certain embodiments, the required collection time is decreased by at least 50%. In certain embodiments, the required collection time is decreased by at least 80%. In certain embodiments, the required collection time is decreased by at least 90%.

The enhanced scintillator described herein may be used in a variety of industries and applications.

In one embodiment, the scintillator is used to enhance cathodoluminescence in electron microscopes, such as is shown in FIG. 2A. In this application, a designed nanophotonic structure (e.g., a photonic crystal, a multilayer film, a collection of nanoparticles, or plasmonic structures) is placed in spatial proximity to the material to be analyzed through its cathodoluminescence (e.g., by cathodoluminescence microscopy). The structure is designed (via the methods above) to maximize the emission yield at a particular frequency, allowing, for example, the signal-to-noise of the optical emission of isolated defects to be enhanced.

Figure 6:
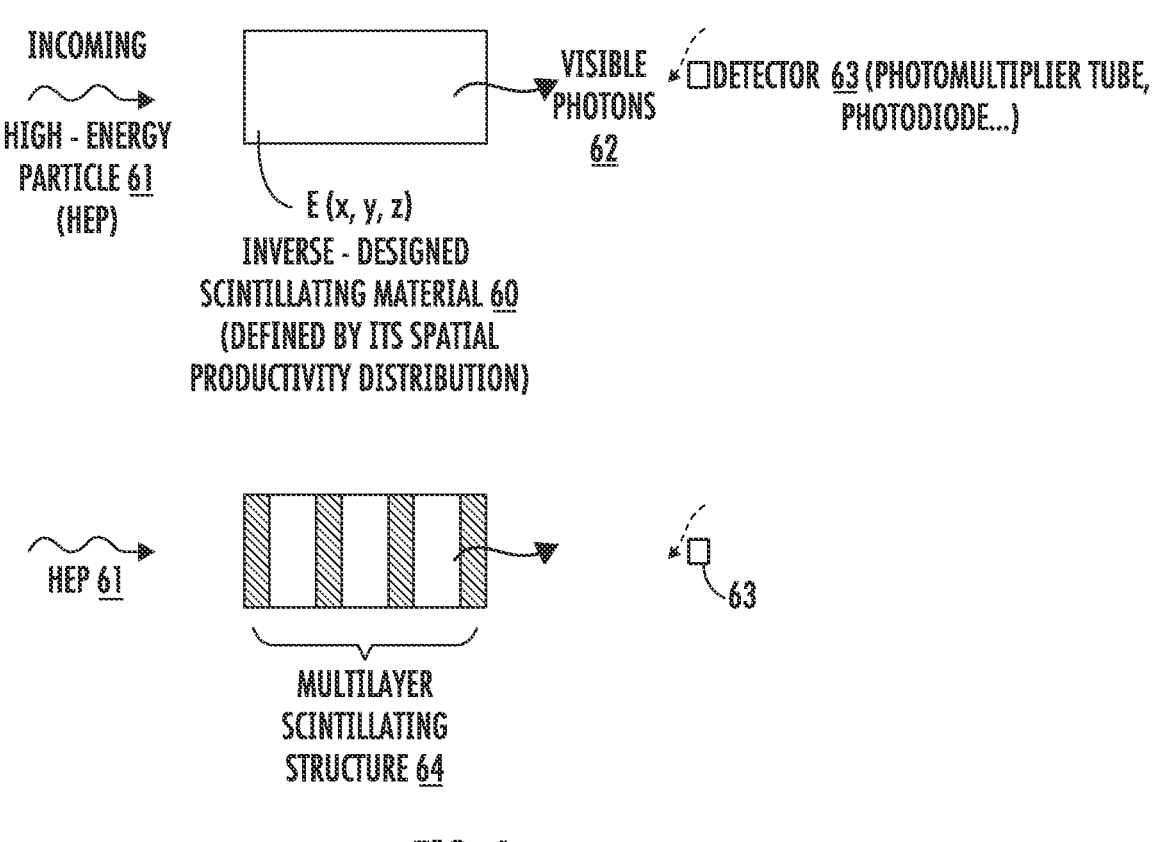
FIG. 6 shows the use of the enhanced scintillator in a PET scanner.

In another embodiment, the enhanced scintillator allows for enhanced detection of gamma rays for PET and CT scanners. In this application, a volume-filling pattern (e.g., a self-assembled 3D structure, or a multilayer film) is created in a material hosting dopants (including, but not limited to orthosilicates and rare-earth doped materials) that strongly convert gamma radiation into light. The enhanced yield, as well as faster emission translates into faster timing resolution and better energy resolution and signal. This enables the PET scan to be more accurate, as well as to be conducted for a shorter period of time. The end result is a scintillating detector, which can be integrated with photomultiplier tubes (or other light detectors, such as silicon photomultipliers) as part of a full PET scan system. As example in shown in FIG. 6. An incoming high-energy particle 61 is converted into visible photons 62 through the scintillation process in an inverse-designed scintillating structure 60 described by its spatial permittivity distribution. The visible photons 62 are then detected by a light detector 63 (including but not limited to photomultiplier tube, photodiode). The inverse-designed structure 60 can be optimized to yield maximum scintillation going into the detector 63, taking into geometrical (location, angular aperture of the detector) and fabrication (material, minimum feature size) of the device. In one specific embodiment, also shown in FIG. 6, the device is a multilayer scintillating structure 64, where the thickness of the layers is optimized to yield maximum scintillation.

In another embodiment, the enhanced scintillator may be used in a CT scanner. This embodiment is similar to that shown above, except uses materials that strongly covert X-rays into light. The required structures are generally smaller, such as on the order of 100 micros or larger in these applications.

In this application, a beam of HEP is first going through a specimen to image (e.g. a mouse) in front of a nanophotonic scintillator, which may be any of the structures defined above, whose output visible light is detected with a camera. The projector can be operated in a static mode, where 2D projections of the specimen are obtained. It can also be operated in a dynamic mode, where the specimen is rotated and translated to collect many 2D projections, followed by a 3D reconstruction step, where a 3D volumetric image of the specimen is reconstructed.

There are several specific embodiments of this application.

Figures 7A, 7B, 7C, 7D:
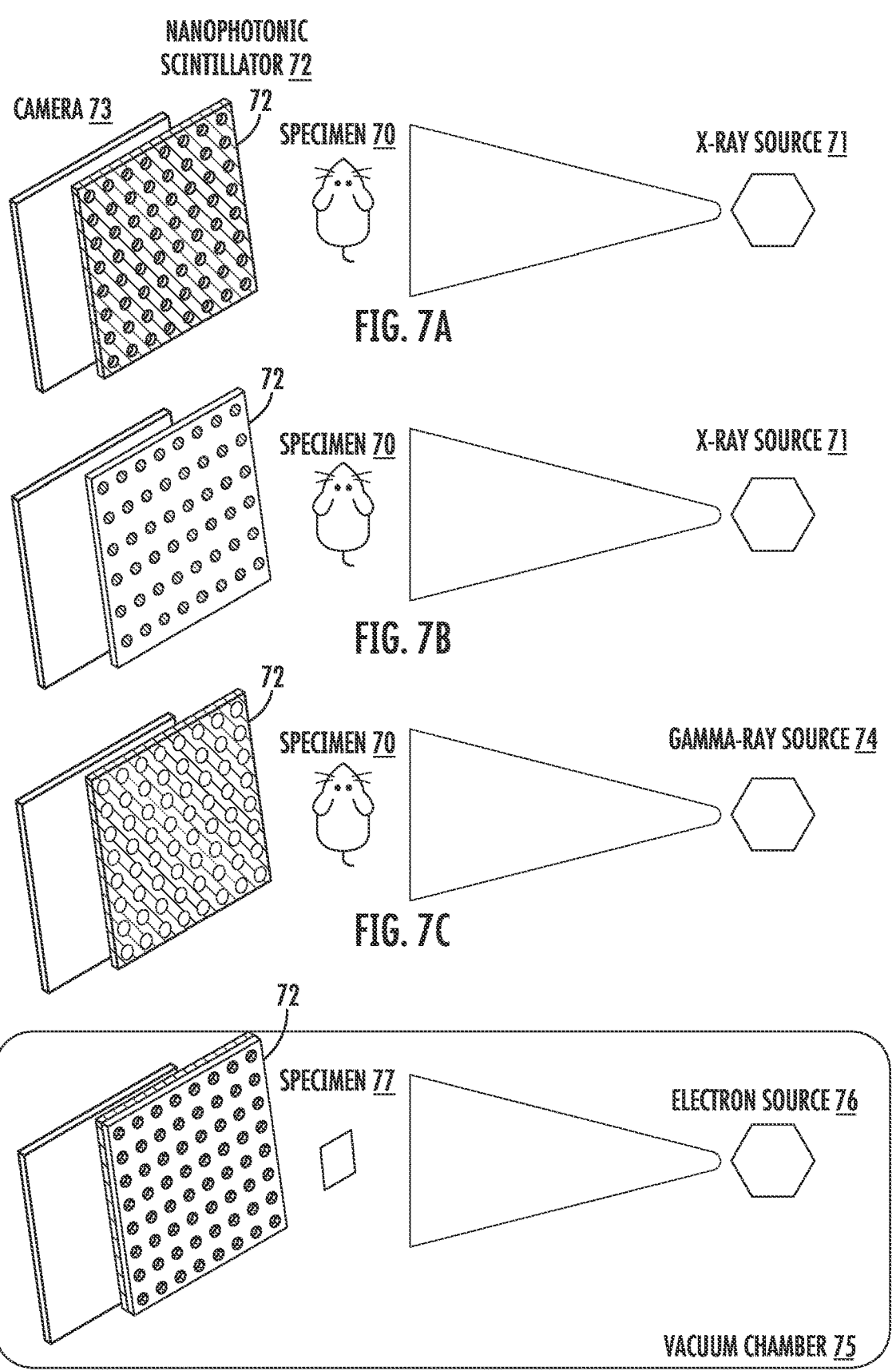
FIGS. 7A-7D shows the use of the enhanced scintillator in a variety of CT scanners.

First, as shown in FIGS. 7A-7B, there are X-Ray CT systems where a beam of X-Rays (1-100 keV) from an X-Ray source 71 is impingent on a specimen 70 to image and a patterned thin film scintillator 72 of thicknesses on the order of 50 nm-250 micrometers, followed by a camera system 73. The particular embodiment shown in FIG. 7A comprises a thin 2D photonic crystal, having a thickness from 100 nm to 5 microns, made of a scintillating material (e.g., CsI(Tl)) to convert low-energy X-Rays (1-20 keV) into visible light. The camera system 73 may be array of photodiodes, pixel, CCD Camera device, scanning imaging device, or another suitable device.

Next, there are gamma-ray micro CT systems, as shown in FIG. 7C, which are similar to the X-Ray CT system described above except that instead of X-Rays, gamma-Rays (100 keV-1 MeV) from a gamma ray source 74 are used. This requires a thicker nanophotonic scintillator, such as 50 nm-10 cm.

Additionally, there are electron microscope scintillator systems, as shown in FIG. 7D, which are similar to the X-Ray CT system described above, and is hosted in a vacuum chamber 75 where incident electrons from an electron source 76 (e.g., a Scanning or Transmission Electron Microscope) (0.1 keV-200 keV) impact the specimen 77. The nanophotonic scintillators may have thicknesses on the order of 10 nm-250 micrometers. This embodiment is particularly adapted to the imaging of electron scattering through thin specimen (10 nm-10 microns) in a transmission electron microscope, for instance.

In these embodiments, the scintillator 72 may take on the form of any of the structures shown in FIG. 5. Further, the construction of these scintillators may vary. FIG. 7A shows holes in the scintillator material, while FIG. 7B shows a non-scintillating material wherein the holes are filled with a scintillating material. FIG. 7C shows a scintillator material having holes that are filled with a non-scintillating material. FIG. 7D shows a patterned non-scintillating material disposed on an unpatterned scintillating material Further, the scintillator may be integrated with a photodetector such as a photomultiplier tube or other photomultiplication device, and this assembly is further integrated into a planar, ring-shaped, or other arrangement of detectors that collect radiation. In a PET scanner, the radiation is emitted from a small volume (e.g., a tumor injected with a radiopharmaceutical that then emits gamma rays), while in a CT scanner, the radiation is directed towards the target from different incidence angles, and the detected radiation is used to reconstruct the target tomographically. For PET applications, in which 511 keV gamma rays are emitted, the overall structure may capture most, such as at least 95% of the energy of the incident gamma rays. For scintillators where the luminescing based material is based on crystals such as LSO, the thickness may be a few cm. For X-ray CT applications, where the X-ray energies are closer to 100 keV, the thicknesses can be a few mm. For X-ray imaging applications in which the X-ray energies can be 10 keV or below, the thicknesses can be on the order of 100 microns to capture most of the energy.

Figures 8, 9A:
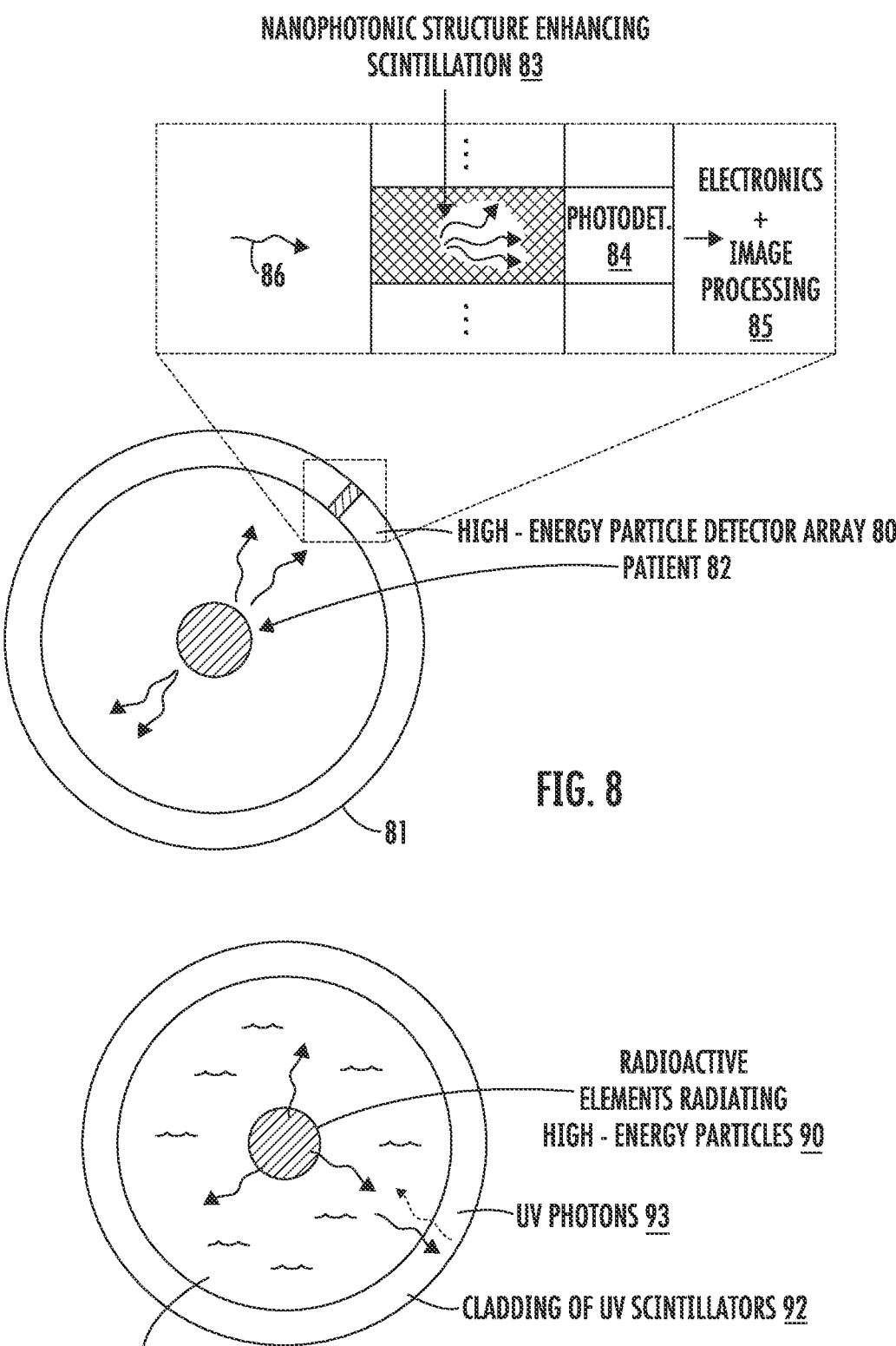
FIG. 8 shows a PET or CT scanner according to another embodiment.
FIGS. 9A-9C show three different embodiments for water purification.

FIG. 8 shows another example of a PET, CT or hybrid PET/CT scanner. The scanner comprises a circular array of high-energy particle detectors 80 contained in the scanner cladding 81. The patient 82 lies at the center of the scanner. High-energy particles are detected by the concept shown in FIG. 6, specifically, incident HEP 86 is converted into visible light via the scintillation process. The visible light is detected by a photodetection system 84 and is then converted into electronic signal for signal processing and image reconstruction 85. Conventional scintillating structures may be replaced by nanophotonic structures enhancing scintillation 83.

This application is not limited to these embodiments and the embodiments can be interchanged for various HEPs (X-Ray, gamma-Ray, electrons, alpha and beta radioactive particles, cosmic rays, etc.)

Additionally, the enhanced scintillators may be used as efficient UV sources for water purification. For example, radioactive agents may be used to emit beta particles that are then converted to UV light. Alternatively, electron sources may be used to bombard the nanophotonic structures, where the energy of the electrons is efficiently converted into UV light.

As shown in FIG. 9A, a radioactive source 90 is immersed and closely contained into a waterproof enclosure. The enclosure is located at or near the center of a container holding water 91. The radiated particles bombard a ring of scintillating devices 92 located in the cladding of the tube. These scintillating devices are designed to radiate mostly inside the tube UV radiation 93, which purifies the water contained in the pool.

Figure 9B:
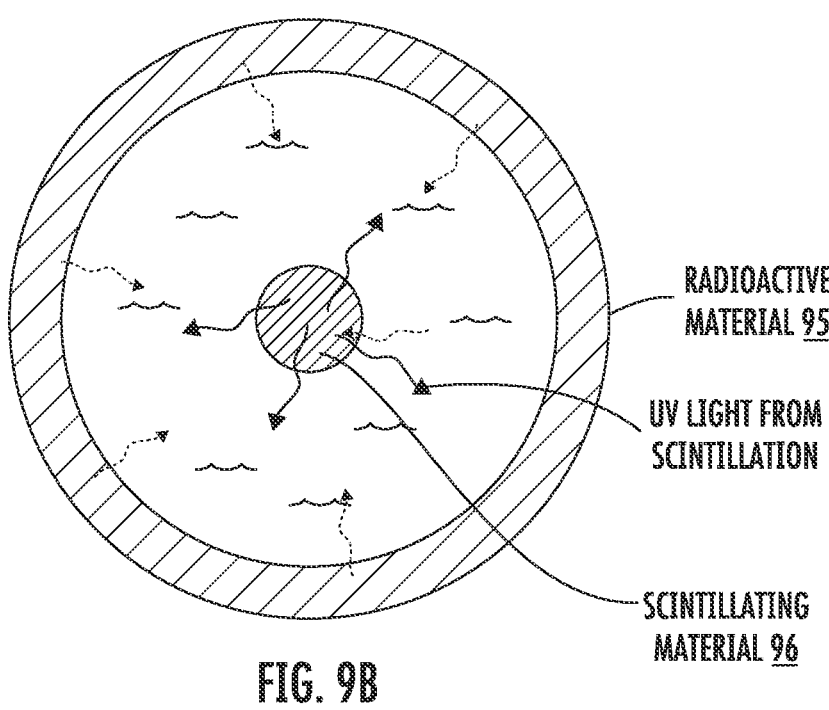

In FIG. 9B, the locations of the radioactive source and the scintillating devices 96 are reversed. In this embodiment, radioactive materials 95 are contained in the cladding of the tube, while the scintillating devices 96 are located at the center of the water pool.

Figure 9C:
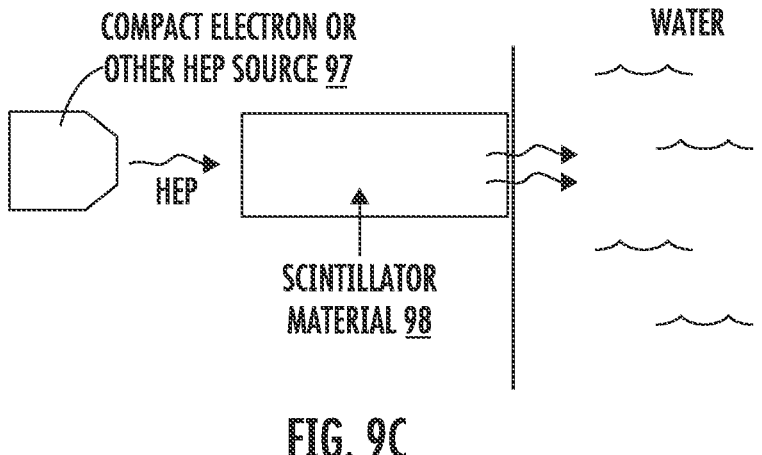

In FIG. 9C, a different embodiment is shown. In this embodiment, a compact high-energy particle source 97 (for instance, but not limited to, an integrated electron gun) transmits a beam of high-energy particles to a scintillator material 98 located in the vicinity of a water container to be purified. The scintillator material 98 emits UV light into the container which serves to purify the water in the container.

In another embodiment, the enhanced scintillators may be used to create a laser. In this application, a nanophotonic structure (nanocavity, multilayer thin film, nanoparticle, etc.) is bombarded by high energy particles which generate scintillating photons. The scintillating photons induce stimulated emission by the scintillating dopants or material (which act as the gain medium). The scintillating photons are trapped in the cavity which provides optical feedback and allows the system to reach above threshold. The threshold pump rate, which goes inversely as the scintillation rate, is readily optimizable by the same framework presented above.

Figure 10A:
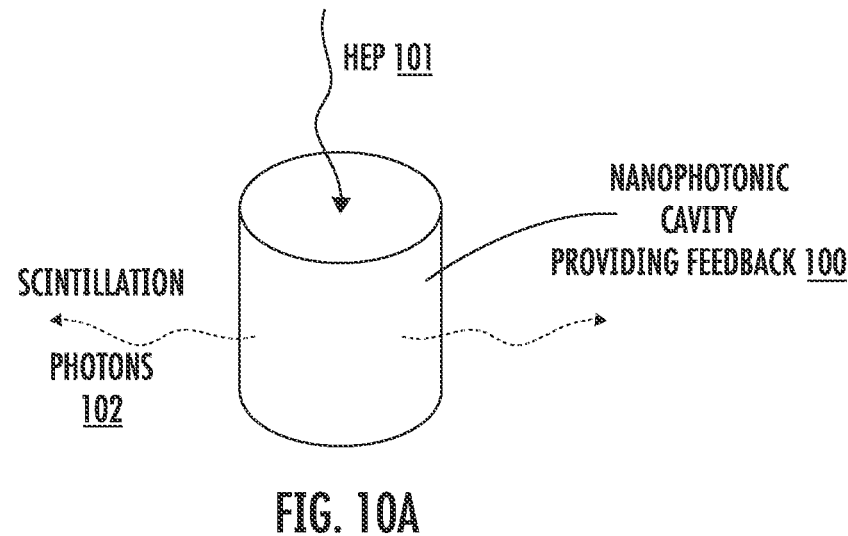
FIG. 10A shows a laser that employs an enhanced scintillator.
Figure 10B:
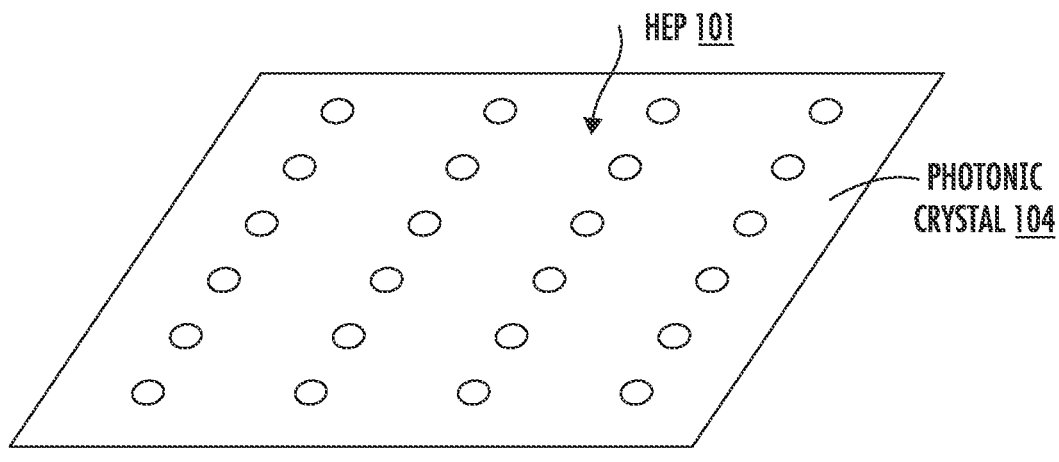
FIG. 10B shows the structure of the cavity in the laser.

An example of this laser is shown in FIG. 10A. A nanophotonic cavity 100 is pumped by a beam 101 of high-energy particles. The beam 101 is converted into scintillating photons 102 which are trapped within the nanophotonic cavity. The system exhibits gain (through the high-energy particle beam) and feedback (through the nanophotonic cavity) and lases above threshold. FIG. 10B shows a particular embodiment of the proposed concept, which is a photonic crystal 104 (cavity) pumped by a beam of high-energy particles 101.

In another example, the enhanced scintillators are used as enhanced detectors for high-energy particle electromagnetic calorimeters. These scintillators are similar to those described above, but in this embodiment, the detector needs to convert high-energy particles such as gamma rays (such as those emitted by the Higgs boson), electrons, and muons into light. The standard crystal used in many HEP calorimeters is NaI(Tl) and in the present inventive framework, this crystal could be integrated into a multilayer film geometry or photonic crystal to enhance the emission yield.

In all cases above, the optimization of the scintillation response can be achieved by inverse-designing scintillator detectors, which convert HEP to visible light, to obtain maximum yield. The resulting inverse-designed scintillator could be described as an arbitrary permittivity distribution, for instance, or in a discretized manner (for instance, the layer thicknesses of a multi-layer thin film).

The present system has many advantages. The improvements are exemplified in the context of HEP detection for medical imaging. Scintillating materials are used in medical imaging devices to detect HEP particles emitted by a radioactive agent injected into a patient or by a HEP source traversing the patient's body or parts of the patient's body. When integrated into scanning machines (PET scans, CT scans; which operate based on gamma and X-Ray irradiation respectively), this framework allows the creation of improved scintillating substrates. Such improved scintillating substrates may emit more scintillation photons for a given incident HEP dose, resulting in greater brightness. This may also result in greater resolution and lower required concentrations in spatial radioactive active agents injected into the patients. Angular control of the radiation also leads to reduced loss associated with photons which do not propagate to the detector, thus also allowing smaller, less bulk scintillators. This framework, which is shown for high-energy electron irradiation, has also direct and immediate implications for beta particle scintillators, which are important for applications in nuclear waste management and decommissioning nuclear sites.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A scintillating device, comprising a substrate having a thickness, wherein the substrate is patterned such that a scintillation yield of the scintillating device is at least 10% greater than a device comprising the substrate having the thickness that is not patterned.

2. The scintillating device of claim 1, wherein the scintillation yield is at least 50% greater than the device comprising the substrate having the thickness that is not patterned.

3. The scintillating device of claim 1, wherein the scintillation yield is at least 100% greater than the device comprising the substrate having the thickness that is not patterned.

4. The scintillating device of claim 1, where the substrate pattern comprises a single hole, square or other shape with features having dimensions between 10 nm and 10 microns, or a periodic or aperiodic array of holes, squares, or other shapes with features having dimensions between 10 nm and 10 microns, wherein the features comprise radius, side length or other geometric parameters.

5. The scintillating device of claim 4, wherein a depth of the holes, squares or other shapes is between 10 nm and 10 microns.

6. The scintillating device of claim 1, where the substrate pattern comprises a single cylinder, post or other extruding structure having dimensions between 10 nm and 10 microns, or a periodic or aperiodic array of cylinders, posts, or other extruding structures having dimensions between 10 nm and 10 microns.

7. The scintillating device of claim 1, where the substrate is patterned in a three-dimensional, periodic or aperiodic fashion.

8. The scintillating device of claim 1, where a metallic thin film is deposited on a surface of the substrate and patterned.

9. The scintillating device of claim 8, wherein the thickness of the metallic thin film is between 1 nm and 1000 nm.

10. The scintillating device of claim 1, where the substrate is patterned in a one-dimensional fashion in a periodic or aperiodic fashion, resulting in an arrangement of multiple layers of materials, where each layer has a thickness of 10 nm to 10 microns.

11. The scintillating device of claim 1, where the substrate comprises one or more layers of materials disposed on a metallic substrate.

12. The scintillating device of claim 11, wherein a top layer is patterned, where a top layer comprises single hole, square, post, cylinder or other extruded structure or a periodic or aperiodic array of holes, squares, posts, cylinders or other extruded structures having a dimension of 10 nm to 10 microns.

13. The scintillating device of claim 1, where one or multiple layers of a two-dimensional material are deposited on the substrate.

14. The scintillating device of claim 13, wherein the two-dimensional material comprises hexagonal boron nitride, graphene, or molybdenum disulphide.

15. The scintillating device of claim 13, wherein the two-dimensional material comprises a single hole, square, post, cylinder or other extruded structure or a periodic or aperiodic array of holes, squares, posts, cylinders or other extruded structures having a dimension of 10 nm to 10 microns.

16. A system to display and reconstruct scintillation emission, comprising:
  a light detection system; and
  the scintillating device of claim 1;
  wherein the system is used to detect high energy particles from a known source in an HEP imaging system or from an environment.

17. An X-Ray imaging system, comprising:
  a light detection system; and
  the scintillating device of claim 1.

18. A system comprising:
  a light detection system;
  an HEP source;
  the scintillating device of claim 1; and
  a specimen, wherein the specimen is located between the scintillating device and the HEP source.

19. The system of claim 18, wherein the system is enclosed in a vacuum chamber, to image the specimen using charged HEPs such as free electrons.

20. The system of claim 19, wherein the system comprises a cathodoluminescence detector in an electron microscope.

* * * * *